US012804585B2

(12) United States Patent
Bao et al.

(10) Patent No.: US 12,804,585 B2
(45) Date of Patent: Nov. 17, 2026

(54) SIDELINK USER EQUIPMENT IDENTIFICATION POSITIONING

(71) Applicant: QUALCOMM INCORPORATED, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 18/547,233

(22) PCT Filed: Mar. 15, 2022

(86) PCT No.: PCT/US2022/020422
§ 371 (c)(1),
(2) Date: Aug. 21, 2023

(87) PCT Pub. No.: WO2022/197729
PCT Pub. Date: Mar. 22, 2022

(65) Prior Publication Data

US 2024/0057016 A1 Feb. 15, 2024

(30) Foreign Application Priority Data

Mar. 18, 2021 (GR) .............................. 20210100172

(51) Int. Cl.
*H04W 64/00* (2009.01)
*G01S 5/00* (2006.01)
*G01S 5/02* (2010.01)

(52) U.S. Cl.
CPC ........... *H04W 64/00* (2013.01); *G01S 5/0072* (2013.01); *G01S 5/0236* (2013.01); *G01S 5/0268* (2013.01); *G01S 2205/008* (2013.01)

(58) Field of Classification Search
CPC ............. G01S 2205/008; G01S 5/0072; G01S 5/0236; G01S 5/0268; H04W 4/02; H04W 64/00; H04W 76/14; H04W 76/15
See application file for complete search history.

(56) References Cited

U.S. PATENT DOCUMENTS 10,264,437 B2 * 4/2019 Poitau .................. H04W 76/14
2014/0301285 A1 10/2014 Ahn et al.
(Continued)

FOREIGN PATENT DOCUMENTS

CN 103841636 A 6/2014
CN 104994549 A 10/2015
(Continued)

OTHER PUBLICATIONS

RLF Setting Delivery Method to Support Delay Communication, U.S. Appl. No. 63/107,135, filed Oct. 29, 2020 (Year: 2020).*
(Continued)

*Primary Examiner* — Timothy X Pham
(74) *Attorney, Agent, or Firm* — Thien T. Nguyen

(57) ABSTRACT

Techniques are provided for utilizing a sidelink discovery interface to determine a location of a user equipment (UE). An example method for determining a location of a mobile device according to the disclosure includes receiving one or more reference signals transmitted via a first radio access technology, determining measurement values for the one or more reference signals, receiving a discovery signal from a station via a second radio access technology that is different from the first radio access technology, wherein the discovery signal includes and identification value associated with the
(Continued)

station, and obtaining the location based at least in part on the measurement values and the discovery signal.

40 Claims, 18 Drawing Sheets

(56) References Cited

U.S. PATENT DOCUMENTS

| | | | | |
|---|---|---|---|---|
| 2016/0095080 A1* | 3/2016 | Khoryaev | G01S 5/0284 455/456.1 |
| 2016/0142898 A1 | 5/2016 | Poitau et al. | |
| 2017/0212206 A1* | 7/2017 | Kim | G01S 5/0205 |
| 2019/0230618 A1 | 7/2019 | Saur et al. | |
| 2021/0219103 A1* | 7/2021 | Wang | G01S 5/0236 |
| 2023/0269812 A1* | 8/2023 | Hahn | H04W 76/19 370/329 |

FOREIGN PATENT DOCUMENTS

| | | | |
|---|---|---|---|
| JP | 2017513439 | A | 5/2017 |
| JP | 2017527806 | A | 9/2017 |
| TW | 201446066 | A | 12/2014 |
| WO | WO-2015081569 | A1 | 6/2015 |
| WO | WO-2019027595 | A1 | 2/2019 |
| WO | 2020064120 | A1 | 4/2020 |
| WO | WO-2022112241 | A1 | 6/2022 |

OTHER PUBLICATIONS

Taiwan Search Report—TW111109943—TIPO—Jul. 17, 2025.

3GPP TR 23700-86-010: "3GPP, Technical Specification Group Services and System Aspects, Study on Architecture Enhancement to Support Ranging Based Services and Sidelink Positioning, (Release 18)", 3GPP, 3GPP TR 23.700-86, 3rd Generation Partnership Project, Mobile Competence Centre, 650, Route Des Lucioles, F-06921, Sophia-Antipolis Cedex, France, No. V0.1.0, Mar. 4, 2022, XP052124360, XP052144386, pp. 1-15, (Feb. 2022).

Intel Corporation: "Motivation for New WID: Enhancement on NR Positioning Support", RP-191159—NR Positioning—Motivation Paper—Final, 3GPP TSG RAN Meeting #84, 3GPP, Mobile Competence Centre, 650, Route Des Lucioles, F-06921, Sophia-Antipolis Cedex, France No. Newport Beach, USA, Jun. 3, 2019-Jun. 6, 2019, Jun. 2, 2019 (Jun. 2, 2019), XP051747369, pp. 1-10, the whole document.

Intel Corporation: "NR Positioning Use Cases, Requirements, Scenarios for V2X and Public Safety", 3GPP TSG RAN WG #91e, RP-210468, 3GPP, Mobile Competence Centre, 650, Route Des Lucioles, F-06921, Sophia-Antipolis Cedex, France, vol. TSG RAN, No. e-Meeting, Mar. 16, 2021-Mar. 26, 2021, Mar. 15, 2021, XP051985815, 8 Pages, the whole document.

International Search Report and Written Opinion—PCT/US2022/020422—ISA/EPO—Aug. 11, 2022.

Partial International Search Report—PCT/US2022/020422—ISA/EPO—Jun. 20, 2022.

Qualcomm Incorporated: "Input to Scenarios and Requirements for in-Coverage, Partial-Coverage, and Out-of-Coverage NR Positioning use Cases", 3GPP TSG-RAN #92e, RP-211325, 3GPP, Mobile Competence Centre, 650, Route Des Lucioles, F-06921, Sophia-Antipolis Cedex, France, vol. TSG RAN, No. Electronic Meeting, Jun. 14, 2021-Jun. 18, 2021, Jun. 7, 2021, XP052025397, 9 Pages, the whole document.

Taiwan Search Report—TW111109943—TIPO—Jun. 8, 2026.

* cited by examiner

SIDELINK USER EQUIPMENT IDENTIFICATION POSITIONING

CROSS-REFERENCE TO RELATED APPLICATION

This application is the National Stage of International Application No. PCT/US2022/020422, filed Mar. 15, 2022, entitled "SIDELINK USER EQUIPMENT IDENTIFICATION POSITIONING," which claims priority under 35 U.S.C. § 119 to Greek Patent Application No. 20210100172, entitled "SIDELINK USER EQUIPMENT IDENTIFICATION POSITIONING", filed Mar. 18, 2021, both of which are assigned to the assignee hereof, and the entire contents of both of which are expressly incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) server (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Further, the capabilities of UE's may vary and positioning methods may be based on the capabilities of the devices.

SUMMARY

An example method for determining a location of a mobile device according to the disclosure includes receiving one or more reference signals transmitted via a first radio access technology, determining measurement values for the one or more reference signals, receiving a discovery signal from a station via a second radio access technology that is different from the first radio access technology, wherein the discovery signal includes and identification value associated with the station, and obtaining the location based at least in part on the measurement values and the discovery signal.

Implementations of such a method may include one or more of the following features. The first radio access technology may be a cellular communication network and the second radio access technology may be a device-to-device communication interface. The cellular communication network may be a long-term evolution network or a fifth generation new radio network, and the device-to-device communication interface may be a PC5 interface. The identification value may be an international mobile equipment identity value, or a sidelink sequence identification value associated with the station. The measurement values may include one of a reference signal received power, a reference signal received quality, a received signal strength indication, a time of arrival, and a round trip signal propagation time. The measurement values may include a base station identification value, or a beam identification value associated with at least one of the one or more reference signals. The measurement values and the identification value associated with the station may be transmitted to a network server, such that obtaining the location may include receiving the location from the network server. The measurement values and the identification value associated with the station may be transmitted in single message. The method may include receiving one or more sidelink reference signals transmitted via the second radio access technology, determining sidelink measurement values for the one or more sidelink reference signals, and obtaining the location based at least in part on the sidelink measurement values. Assistance data may be received from a network server and obtaining the location may be based at least in part on the measurement values, the discovery signal, and the assistance data. The assistance data may include a location of the station and a range class associated with the station.

An example method for determining a location of a mobile device according to the disclosure includes receiving one or more reference signal measurement values from the mobile device, wherein the one or more reference signal measurement values are based on signals transmitted via a first radio access technology, receiving one or more neighbor identification values from the mobile device, wherein the one or more neighbor identification values are based on signals received by the mobile device via a second radio access technology that is different from the first radio access technology, determining a location of a station for at least one of the one or more neighbor identification values, and determining the location of the mobile device based at least in part on the one or more reference signal measurement values and the location of the station.

Implementations of such a method may include one or more of the following features. The first radio access technology may be a cellular communication network and the second radio access technology may be a device-to-device communication interface. The cellular communication network may be a long-term evolution network or a fifth generation new radio network, and the device-to-device communication interface may be a PC5 interface. The one or more neighbor identification values may include an international mobile equipment identity value, or a sidelink sequence identification value associated with the station. The one or more reference signal measurement values may include one of a reference signal received power, a reference signal received quality, a received signal strength indication, a time of arrival, and a round trip signal propagation time. The one or more reference signal measurement values may include a base station identification value, or a beam identification value associated with at least one of the signals transmitted via the first radio access technology. The one or more reference signal measurement values and the one or more neighbor identification values may be received in single message. The method may include receiving one or more sidelink measurement values based on signals received by the mobile device via the second radio access technology, and determining the location based at least in part on the one or more sidelink measurement values. Assistance data may be provided to the mobile device, such that the assistance data includes location information for one or more neighboring stations.

An example method for determining a location of a mobile device according to the disclosure includes receiving a discovery signal from at least one neighboring station via a sidelink, wherein the discovery signal includes an identification value associated with the at least one neighboring station, and obtaining the location based at least in part on the discovery signal.

Implementations of such a method may include one or more of the following features. Receiving assistance data including identification information and location information associated with one or more neighboring stations, such that obtaining the location is based at least in part on the assistance data. The assistance data may include a range class associated with the at least one neighboring station. The identification information may include an international mobile equipment identity value, or a sidelink sequence identification value associated with the at least one neighboring station. The identification value may be a sidelink sequence identification value associated with the at least one neighboring station. Transmitting the identification value associated with the at least one neighboring station to a network server, such that obtaining the location may include receiving the location from the network server. Obtaining one or more sidelink measurement values based on one or more sidelink messages transmitted from the at least one neighboring station, such that the one or more sidelink measurement values may include one of a reference signal received power, a reference signal received quality, a received signal strength indication, a time of arrival, and a round trip signal propagation time. Transmitting the identification value associated with the at least one neighboring station to a network station via a sidelink, such that obtaining the location may include receiving the location from the network station via the sidelink. The at least one neighboring station may be a user equipment, and the discovery signal is received via a sidelink. The sidelink may be a PC5 interface. The at least one neighboring station may be a base station, and the discovery signal may be received via a Uu interface.

An example apparatus according to the disclosure includes a memory, at least one transceiver, at least one processor communicatively coupled to the memory and the at least one transceiver, and configured to receive one or more reference signals transmitted via a first radio access technology, determine measurement values for the one or more reference signals, receive a discovery signal from a station via a second radio access technology that is different from the first radio access technology, wherein the discovery signal includes and identification value associated with the station, and obtain the location based at least in part on the measurement values and the discovery signal.

Implementations of such an apparatus may include one or more of the following features. The at least one processor may be further configured to transmit the measurement values and the identification value associated with the station to a network server, such that obtaining the location includes receiving the location from the network server. The at least on processor may be further configured to receive one or more sidelink reference signals transmitted via the second radio access technology, determine sidelink measurement values for the one or more sidelink reference signals; and obtain the location based at least in part on the sidelink measurement values.

An example apparatus according to the disclosure includes a memory, at least one transceiver, at least one processor communicatively coupled to the memory and the at least one transceiver, and configured to receive one or more reference signal measurement values from a mobile device, wherein the one or more reference signal measurement values are based on signals transmitted via a first radio access technology, receive one or more neighbor identification values from the mobile device, wherein the one or more neighbor identification values are based on signals received by the mobile device via a second radio access technology that is different from the first radio access technology, determine a location of a station for at least one of the one or more neighbor identification values, and determine a location of the mobile device based at least in part on the one or more reference signal measurement values and the location of the station.

Implementations of such an apparatus may include one or more of the following features. The at least one processor may be further configured to receive one or more sidelink measurement values based on signals received by the mobile device via the second radio access technology, and determine the location based at least in part on the one or more sidelink measurement values.

An example apparatus according to the disclosure includes a memory, at least one transceiver, at least one processor communicatively coupled to the memory and the at least one transceiver, and configured to receive a discovery signal from at least one neighboring station, wherein the discovery signal includes an identification value associated with the at least one neighboring station, and obtain a location based at least in part on the discovery signal.

Implementations of such an apparatus may include one or more of the following features. The at least one processor may be further configured to receive assistance data including identification information and location information associated with one or more neighboring stations, wherein obtaining the location is based at least in part on the assistance data. The assistance data may include a range class associated with the at least one neighboring station. The identification information may include an international mobile equipment identity value or a sidelink sequence identification value associated with the at least one neighboring station. The identification value may be a sidelink sequence identification value associated with the at least one neighboring station. The at least one processor may be further configured to obtain one or more sidelink measurement values based on one or more sidelink messages transmitted from the at least one neighboring station, such that the one or more sidelink measurement values may include one of a reference signal received power, a reference signal received quality, a received signal strength indication, a time of arrival, and a round trip signal propagation time. The at least one processor may be further configured to transmit the identification value associated with the at least one neighboring station to a network station via a sidelink, such that obtaining the location may include receiving the location from the network station via the sidelink. The at least one neighboring station may be a user equipment, and the discovery signal is received via a sidelink. The sidelink may a PC5 interface. The at least one neighboring station may be a base station, and the discovery signal may be received via a Uu interface.

An example apparatus for determining a location of a mobile device according to the disclosure includes means for receiving one or more reference signals transmitted via a first radio access technology, means for determining measurement values for the one or more reference signals, means for receiving a discovery signal from a station via a second radio access technology that is different from the first radio access technology, wherein the discovery signal includes and identification value associated with the station, and means for obtaining the location based at least in part on the measurement values and the discovery signal.

An example apparatus for determining a location of a mobile device according to the disclosure includes means for receiving one or more reference signal measurement values from the mobile device, wherein the one or more reference signal measurement values are based on signals transmitted via a first radio access technology, means for receiving one or more neighbor identification values from the mobile device, wherein the one or more neighbor identification values are based on signals received by the mobile device via a second radio access technology that is different from the first radio access technology, means for determining a location of a station for at least one of the one or more neighbor identification values, and means for determining the location of the mobile device based at least in part on the one or more reference signal measurement values and the location of the station.

An apparatus for determining a location of a mobile device according to the disclosure includes means for receiving a discovery signal from at least one neighboring station, wherein the discovery signal includes an identification value associated with the at least one neighboring station, and means for obtaining the location based at least in part on the discovery signal.

An example non-transitory processor-readable storage medium comprising processor-readable instructions configured to cause one or more processors to determine a location of a mobile device according to the disclosure includes code for receiving one or more reference signals transmitted via a first radio access technology, code for determining measurement values for the one or more reference signals, code for receiving a discovery signal from a station via a second radio access technology that is different from the first radio access technology, wherein the discovery signal includes and identification value associated with the station, and code for obtaining the location based at least in part on the measurement values and the discovery signal.

An example non-transitory processor-readable storage medium comprising processor-readable instructions configured to cause one or more processors to determine a location of a mobile device according to the disclosure includes code for receiving one or more reference signal measurement values from the mobile device, wherein the one or more reference signal measurement values are based on signals transmitted via a first radio access technology, code for receiving one or more neighbor identification values from the mobile device, wherein the one or more neighbor identification values are based on signals received by the mobile device via a second radio access technology that is different from the first radio access technology, code for determining a location of a station for at least one of the one or more neighbor identification values, and code for determining the location of the mobile device based at least in part on the one or more reference signal measurement values and the location of the station.

An example non-transitory processor-readable storage medium comprising processor-readable instructions configured to cause one or more processors to determine a location of a mobile device according to the disclosure includes code for receiving a discovery signal from at least one neighboring station, wherein the discovery signal includes an identification value associated with the at least one neighboring station, and code for obtaining the location based at least in part on the discovery signal.

Items and/or techniques described herein may provide one or more of the following capabilities, as well as other capabilities not mentioned. A mobile device may utilize terrestrial or satellite navigation techniques to obtain a position estimate. The position computations may provide an ambiguous result. The mobile device may utilize a sidelink interface to detect neighboring stations. The neighboring stations may be in known locations. The mobile device may utilize a sidelink discovery process to obtain identification information for the neighboring stations. The identification information may be used to determine the locations of the neighboring stations. For example, a network server may include a data structure containing the locations of the neighboring stations and the associated identifications for the stations. The mobile device may be configured to determine a coarse position based on the locations of the detected neighboring stations. The locations of the detected neighboring stations may be used to reduce the ambiguity in the position estimate for the mobile device. The mobile device may be configured to obtain measurements on signals transmitted from the neighboring stations. The measurement values may be used to reduce the ambiguity in the position estimate. Other capabilities may be provided and not every implementation according to the disclosure must provide any, let alone all, of the capabilities discussed.

DETAILED DESCRIPTION

Techniques are discussed herein for utilizing a sidelink discovery interface to determine a location of a user equipment (UE). In general, sidelink communications include modes of operation to enable device-to-device communications between two or more UEs. The sidelink modes may be supported when a UE is within the coverage of a network (e.g., communicating with a network base station) and when the UE is outside of the coverage area. In an example, a UE may be within the coverage of a network and may utilize reference signals transmitted by network base stations (e.g., cells) to determine a position. Network based positioning techniques, such as round trip time (RTT) measurements, time of arrival (ToA), reference signal time difference (RSTD), angle of arrival (AoA), angle of departure (AoD), and cell identification methods may be used to determine the position of the UE. In an example, the UE may utilize a sidelink discovery process to determine neighboring stations, and the locations of the neighboring stations may be used to reduce ambiguity in network based position estimates. For example, the UE may be configured to obtain identification information of the neighboring stations via a sidelink discovery process, and then provide the identification information to a location server. The location server may utilize the locations of the neighboring stations, and other reference signal measurement information obtained by the UE, to determine a location for the UE. The locations of the neighboring stations may also be used to determine a coarse position of the UE. For example, the location of a UE may be based on the intersection of sidelink coverage areas associated with a plurality of neighboring stations. These techniques and configurations are examples, and other techniques and configurations may be used.

Figure 1:
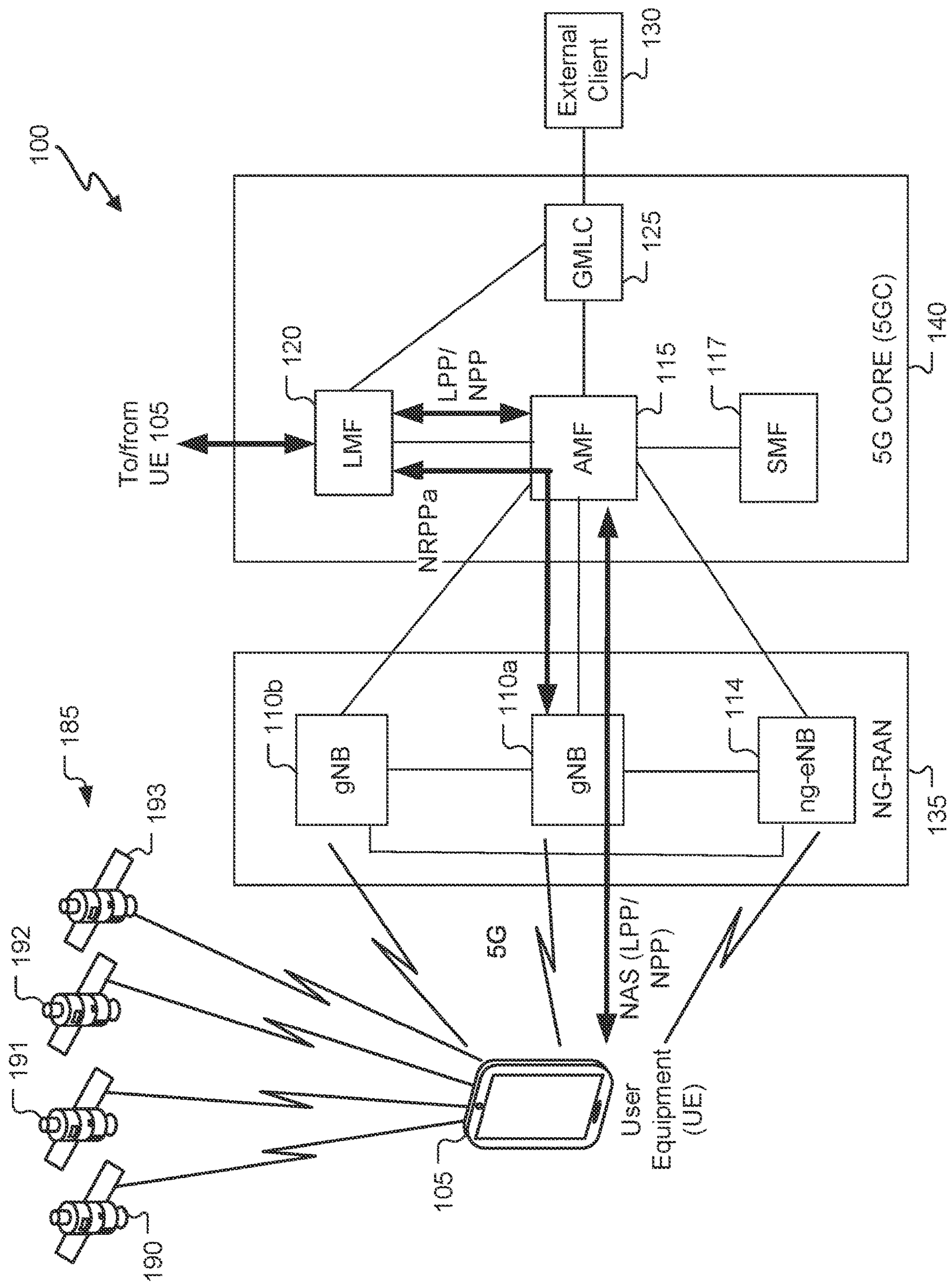
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device. Internet of Things (IoT) device, asset tracker, health monitors, security systems, smart city sensors, smart meters, wearable trackers, or some other portable or moveable device. As used herein the term station may include a base station, a mobile station, or other devices configured to communicate on a wireless or wired network. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 10*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs (e.g., the gNB 110*a*, gNB 110*b*, ng-eNB 114) may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*. 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT). Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS). WLAN, E-CID, and/or OTDOA (or some other position method). In the case of E-CID, the LPP or NPP message may instruct the UE 105 to obtain one or more measurement quantities (e.g., beam ID, beam width, mean angle, RSRP. RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
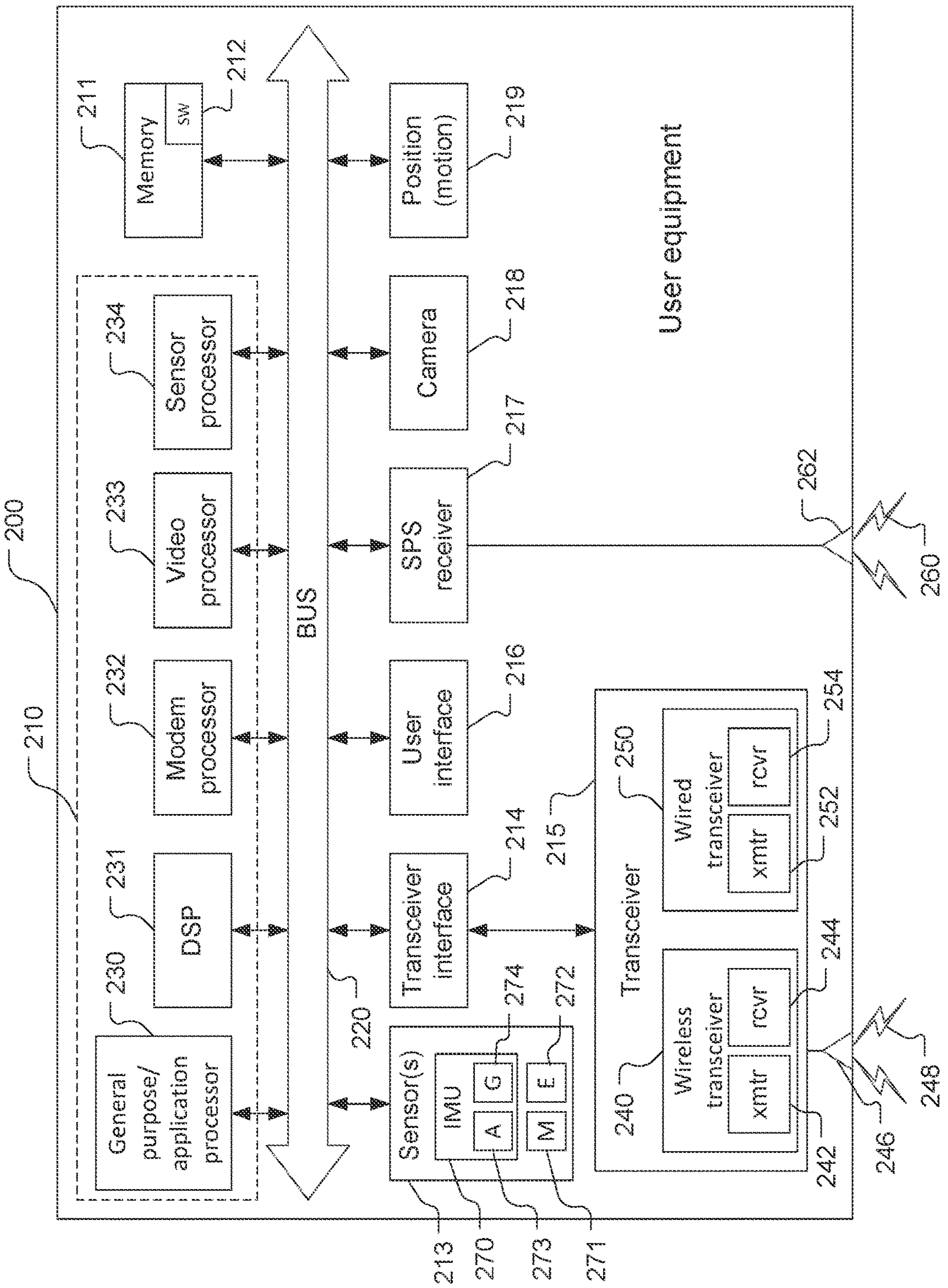
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle to Everything (V2X) (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. Functionality of the PMD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
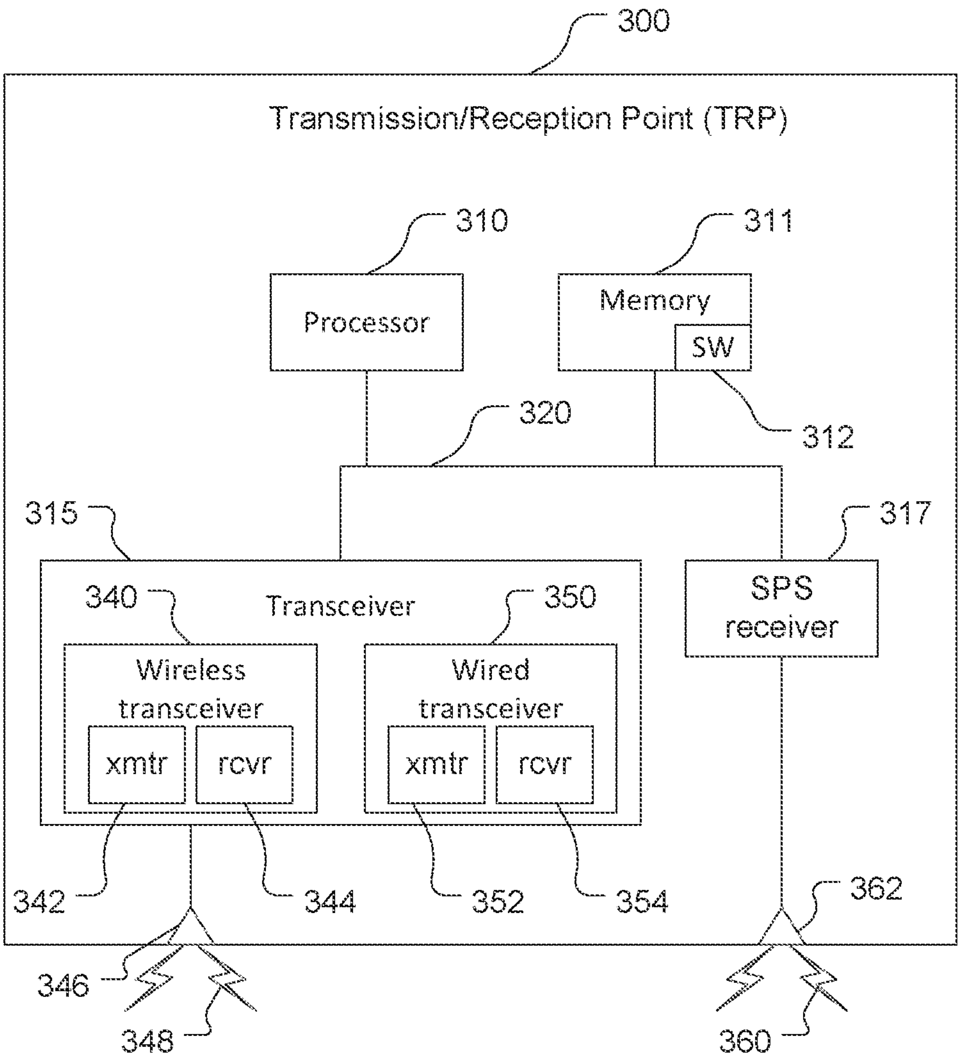
FIG. 3 is a block diagram of components of an example transmission/reception point shown in FIG. 1.

Referring also to FIG. 3, an example of a TRP 300 of the gNB 110*a*, gNB 110*b*, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110*a*, gNB 110*b*, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
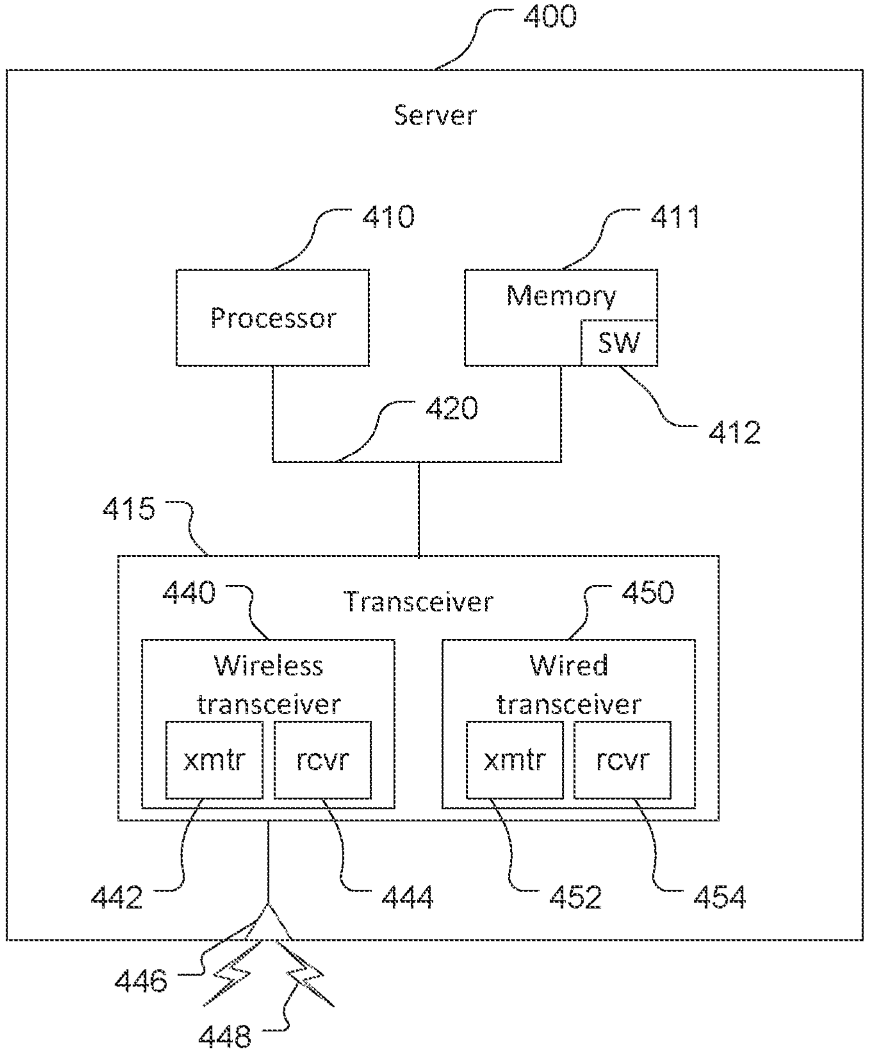
FIG. 4 is a block diagram of components of an example server shown in FIG. 1.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System). CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 30) and/or the UE 200 may be configured to perform one or more of these functions).

One or more of many different techniques may be used to determine position estimates of an entity such as the UE 105, 200. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device. In an example, these and other position-determination techniques may be supplemented by the sidelink UE identification (SL-UEID) techniques described herein.

Figure 5:
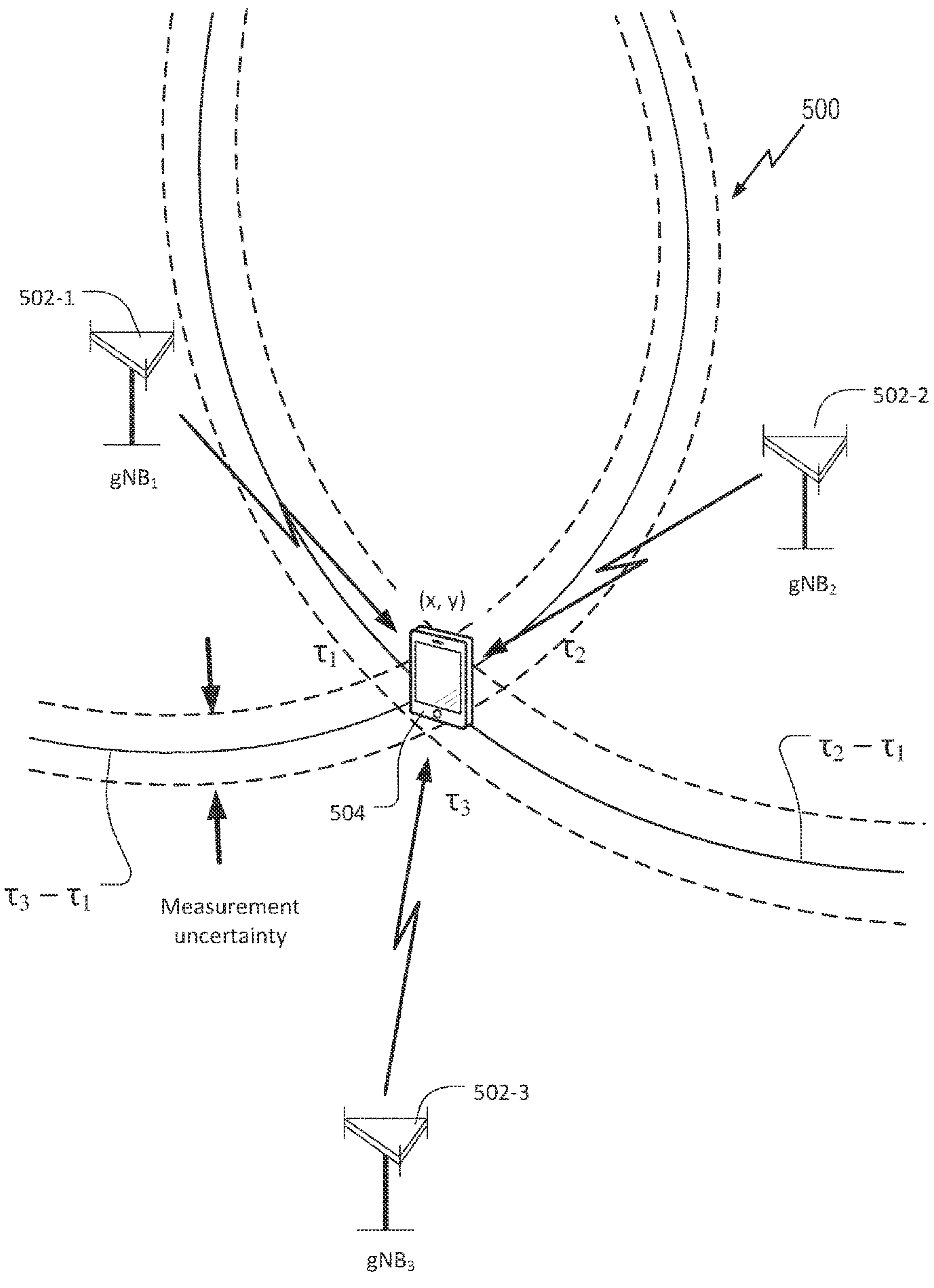
FIGS. 5 and 6 are diagrams illustrating exemplary techniques for determining a position of a mobile device using information obtained from a plurality of base stations.

Referring to FIG. 5, an exemplary wireless communications system 500 is shown. In the example of FIG. 5, a UE 504, which may correspond to any of the UEs described herein, is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, geometry, etc.), the UE 504 may determine its position, or assist in the determination of its position, in a predefined reference coordinate system. In an aspect, the UE 504 may specify its position using a two-dimensional (2D) coordinate system, however, the features disclosed herein are not so limited, and may also be applicable to determining positions using a three-dimensional (3D) coordinate system, if the extra dimension is desired. Additionally, while FIG. 5 illustrates one UE 504 and three base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the server 400 (e.g., the LMF 120), or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., server 400, LMF 120) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases, OTDOA assistance data may also include "expected RSTD" parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., server 400, LMF 120) may send the assistance data to the UE 504, alternatively, the assistance data can originate directly from the network nodes (e.g., base stations 502) themselves (e.g., in periodically broadcasted overhead messages, etc.). Alternatively, the UE 504 can detect neighbor network nodes itself without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., server 400, LMF 120, a base station 502) or the UE 504 may estimate a position of the UE 504. More particularly, the RSTD for a neighbor network node "k" relative to a reference network node "Ref" may be given as (ToAk−ToARef), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau 2-\tau 1$ and $\tau 3-\tau 1$, where $\tau 1$, $\tau 2$, and $\tau 3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the location server 400/LMF 120. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the location server 400/LMF 120).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., location server 400, LMF 120). In some implementations, a location estimate for the UE 504 may be obtained (e.g., by the UE 504 itself or by the location server 400/LMF 120) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS)) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols). Round-trip-time (RTT)-based methods generally need coarse timing synchronization, and as such, are a practical positioning method in NR.

Figure 6:
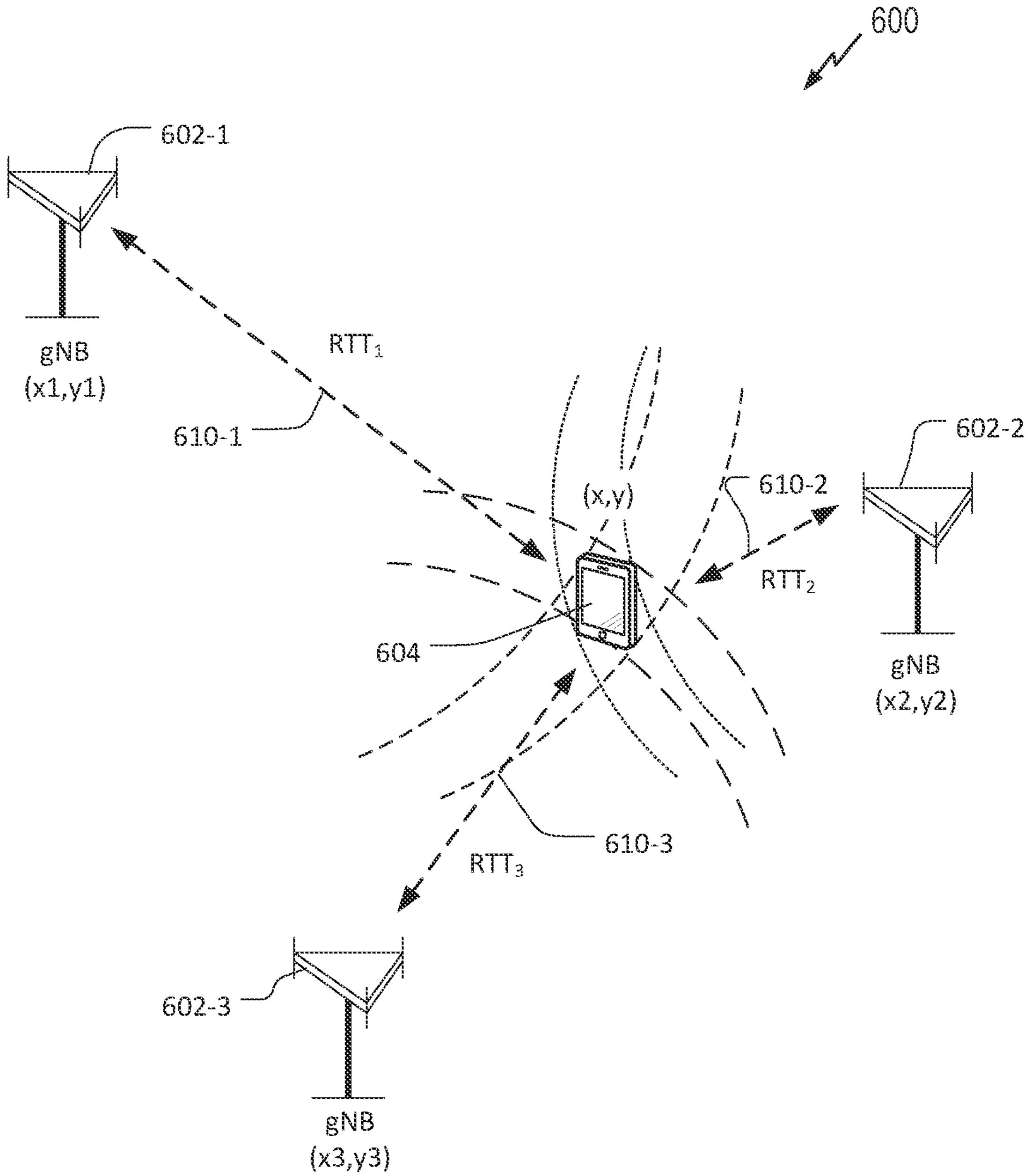

Referring to FIG. 6, an exemplary wireless communications system 600 is shown. In the example of FIG. 6, a UE 604 (which may correspond to any of the UEs described herein) is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (which may correspond to any of the base stations described herein) using RF signals and standardized protocols for the modulation of the RF signals and the exchange of information packets. By extracting different types of information from the exchanged RF signals and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the features disclosed herein are not so limited, and may also be applicable to determining positions using a three-dimensional coordinate system, if the extra dimension is desired. Additionally, while FIG. 6 illustrates one UE 604 and three base stations 602-1, 602-2, 602-3, as will be appreciated, there may be more UEs 604 and more base stations.

To support position estimates, the base stations 602-1, 602-2, 602-3 may be configured to broadcast reference RF signals (e.g., PRS, NRS, CRS. TRS, CSI-RS. PSS, SSS, etc.) to UEs 604 in their coverage area to enable a UE 604 to measure characteristics of such reference RF signals. For example, the UE 604 may measure the ToA of specific reference RF signals (e.g., PRS, NRS, CRS, CSI-RS, etc.) transmitted by at least three different base stations and may use the RTT positioning method to report these ToAs (and additional information) back to the serving base station (e.g., base station 602-2) or another positioning entity (e.g., location server 400, LMF 120).

In an aspect, although described as the UE 604 measuring reference RF signals from a base station 602-1, 602-2, 602-3, the UE 604 may measure reference RF signals from one of multiple cells supported by a base station 602-1, 602-2, 602-3. Where the UE 604 measures reference RF signals transmitted by a cell supported by a base station 602-2, the at least two other reference RF signals measured by the UE 604 to perform the RTT procedure would be from cells supported by base stations 602-1, 602-3 different from the first base station 602-2 and may have good or poor signal strength at the UE 604.

In order to determine the position (x, y) of the UE 604, the entity determining the position of the UE 604 needs to know the locations of the base stations 602-1, 602-2, 602-3, which may be represented in a reference coordinate system as ($x_k$, $y_k$), where k=1, 2, 3 in the example of FIG. 6. Where one of the base stations 602-2 (e.g., the serving base station) or the UE 604 determines the position of the UE 604, the locations of the involved base stations 602-1, 602-3 may be provided to the serving base station 602-2 or the UE 604 by a location server with knowledge of the network geometry (e.g., location server 400. LMF 120). Alternatively, the location server may determine the position of the UE 604 using the known network geometry.

Either the UE 604 or the respective base station 602-1, 602-2, 602-3 may determine the distance (dk, where k=1, 2, 3) between the UE 604 and the respective base station 602-1, 602-2, 602-3. In an aspect, determining the RTT 610-1, 610-2, 610-3 of signals exchanged between the UE 604 and any base station 602-1, 602-2, 602-3 can be performed and converted to a distance (dk). RTT techniques can measure the time between sending a signaling message (e.g., reference RF signals) and receiving a response. These methods may utilize calibration to remove any processing and hardware delays. In some environments, it may be assumed that the processing delays for the UE 604 and the base stations 602-1, 602-2, 602-3 are the same. However, such an assumption may not be true in practice.

Once each distance dk is determined, the UE 604, a base station 602-1, 602-2, 602-3, or the location server (e.g., location server 400, LMF 120) can solve for the position (x, y) of the UE 604 by using a variety of known geometric techniques, such as, for example, trilateration. From FIG. 6, it can be seen that the position of the UE 604 ideally lies at the common intersection of three semicircles, each semicircle being defined by radius dk and center ($x_k$, $y_k$), where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 604 from the location of a base station 602-1, 602-2, 602-3). The intersection of the two directions at or near the point (x, y) can provide another estimate of the location for the UE 604.

A position estimate (e.g., for a UE 604) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 7A:
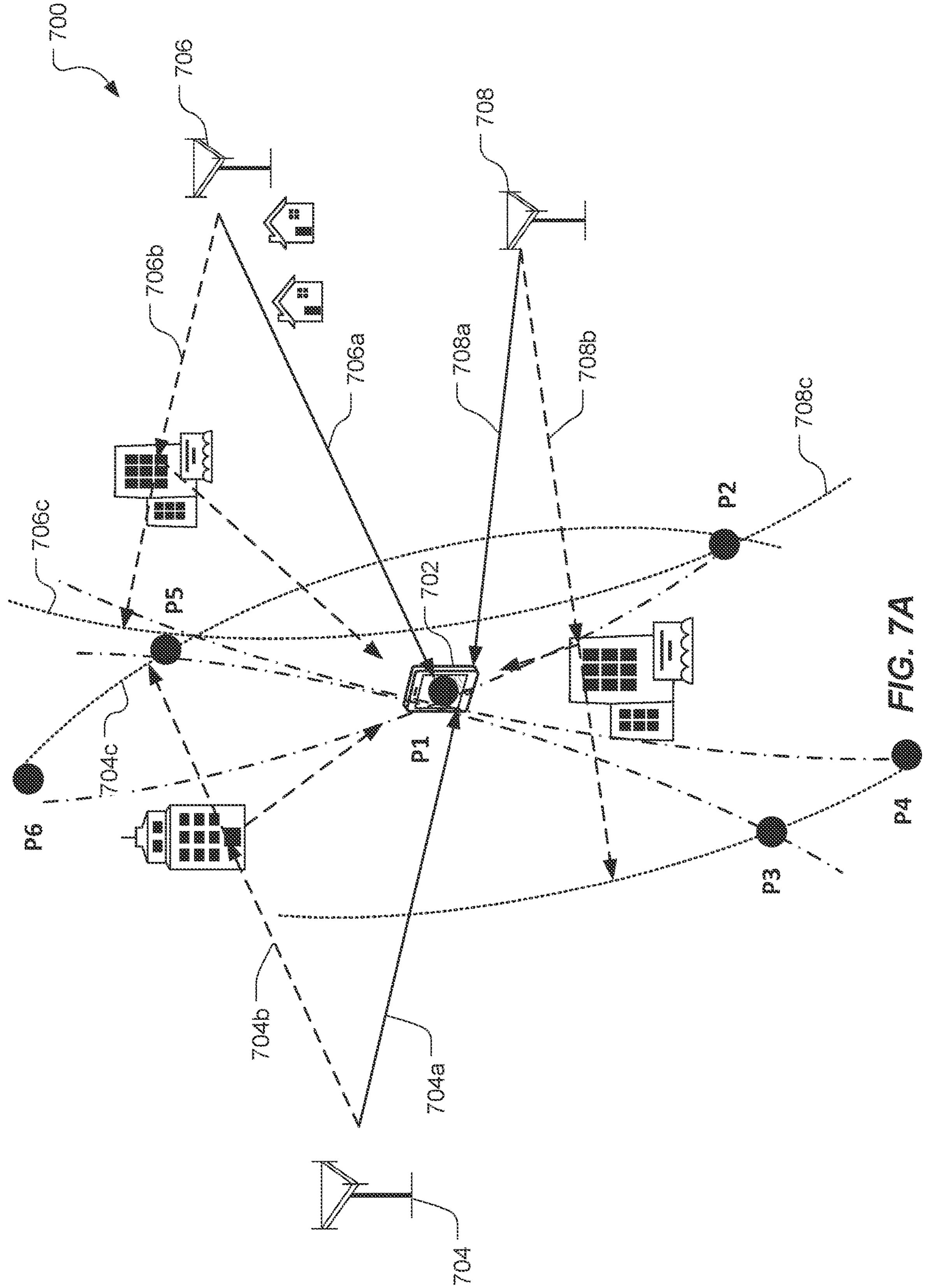
FIG. 7A is a diagram of positioning errors associated with non-line of sight signal measurements.

Referring to FIG. 7A, a diagram 700 of positioning errors associated with non-line of sight signal measurements is shown. The diagram 700 includes a UE 702, which may correspond to any of the UEs described herein, and a plurality of base stations 704, 706, 708, which may correspond to any combinations of the base stations described herein. As described above, the UE 702, or the network entities such as the LMF 120, may utilize reference signals transmitted from the base stations 704, 706, 708 to determine a current location. The signals, distances and position estimates in the diagram 700 are examples and provided to describe the potential impact of measurements based on non-line of sight signal paths. In an example, multilateration techniques may be used to process measurements associated with a downlink positioning reference signal (DL PRS) transmitted via a first line of sight (LOS) path 704*a* from the first base station 704, a DL PRS transmitted via a second LOS path 706*a* from the second base station 706, and a DL PRS transmitted via a third LOS path 708*a* from the third base station 708. A first location estimate P1 may be the result of the multilateration computations, which is an accurate estimate of the current location of the UE 702. In some positioning sessions, however, environmental factors such as the presence of buildings, or other obstructions which may attenuate or reflect signals transmitted from the base stations, may cause a target UE to receive signals via multiple paths. For example, the UE 702 may receive a DL PRS from the first station 704 via a first non-line of sight (NLOS) path 704*b* based on the location of a building or other obstruction. Since the first NLOS path 704*b* is longer than the first LOS path 704*a*, a computed first NLOS distance 704*c* is further away from the first base station 704 than the LOS distance. Similarly, a computed second NLOS distance 706*c* based on a second NLOS signal 706*b* from the second base station 706, and a computed third NLOS distance 708*c* based on a second NLOS signal 708*b* from the third base station 708, will be further from their respective base stations as compared to the respective LOS distances. In some cases, the target UE may not be able to distinguish between the LOS and NLOS paths and the corresponding position estimates may vary. Thus, the use of various combinations of LOS and NLOS paths in the positioning computations may result in ambiguity in the position estimates. For example, other position estimates such as P2, P3, P4, P5 and P6 as depicted in the diagram 700 may be the results of a positioning session based on the NLOS paths. The position estimates P1, P2, P3, P4, P5 and P6 are examples to illustrate the potential impact of NLOS signal paths. A positioning session may provide a fewer number, or a greater number of position estimates. Other operations, such as channel estimation and outlier rejection may also be used to manage the resulting position estimates.

Figure 7B:
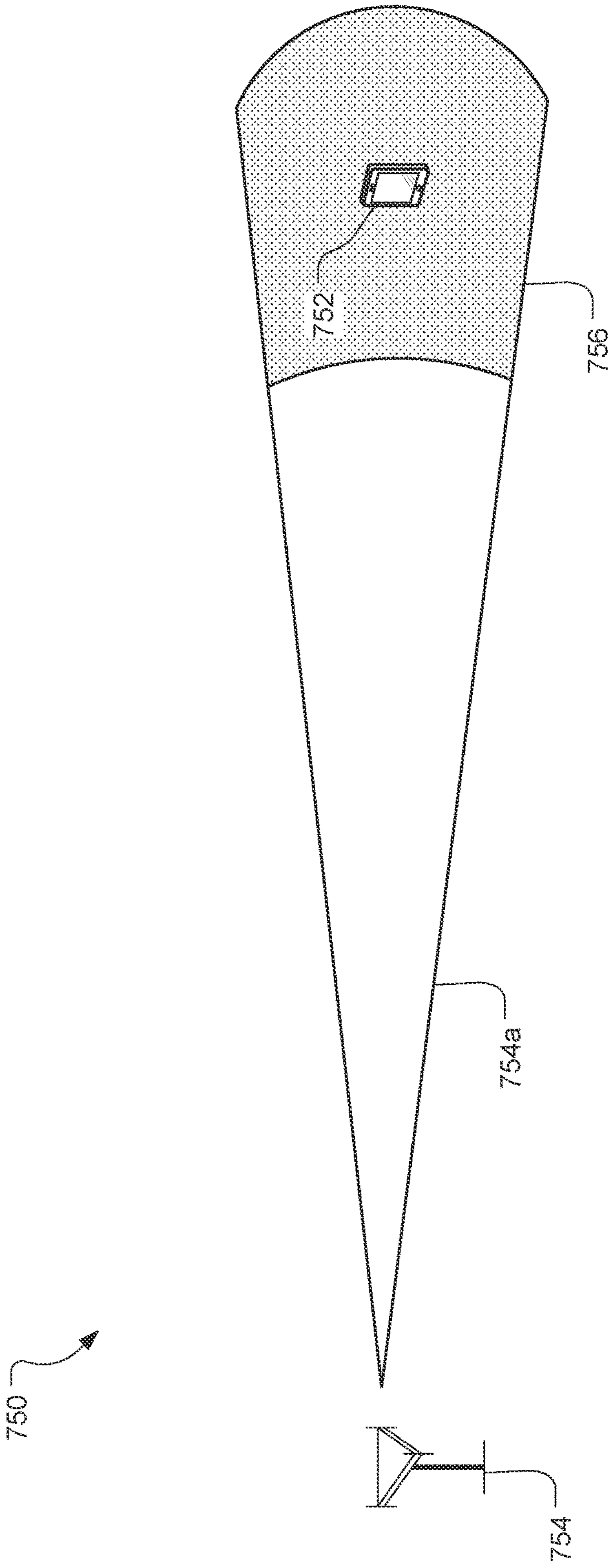
FIG. 7B is a diagram of potential positioning errors associated with enhanced cell identification positioning methods.

Referring to FIG. 7B, a diagram 750 of potential positioning errors associated with enhanced cell identification (E-CID) positioning methods is shown. The diagram 750 includes a UE 752, which may correspond to any of the UEs described herein, and a base station 754, which may correspond to any combinations of the base stations described herein. The base station 754 may be configured to utilize beamforming to transmit reference signals, such as the beam 754*a*. The beam 754*a* may be a directional PRS with a known beam width and boresight angle from the base station 754. In an example, the UE 752 may be configured to determine the angle of departure (AoD) of the beam 754*a* based on beam identification information, and thus use the AoD as a line of position in a positioning computation. The accuracy of the line of position depends on receiving the beam via the LOS path. That is, a beam received via a NLOS path may not correspond to the AoD of the beam from the base station. Thus, the resulting position estimates based on NLOS beam identification values may lead to similar ambiguities as described in FIG. 7A. Additionally, a single beam, such as the beam 754*a*, may be combined with a ranging method (e.g., RTT, RSSI, ToA, etc.) to define a location area 756 based on the beamwidth of the beam 754*a* and the range estimate. The size of the location area 756 may lead to positioning ambiguity since the area may increase based on the ability to measure and control the beamwidth and the distance from the base station. The sidelink UEID techniques described herein may be used to reduce the ambiguities of the resulting position estimates described in FIGS. 7A and 7B, as well as reduce the location uncertainty associated with other positioning techniques.

Figure 8A:
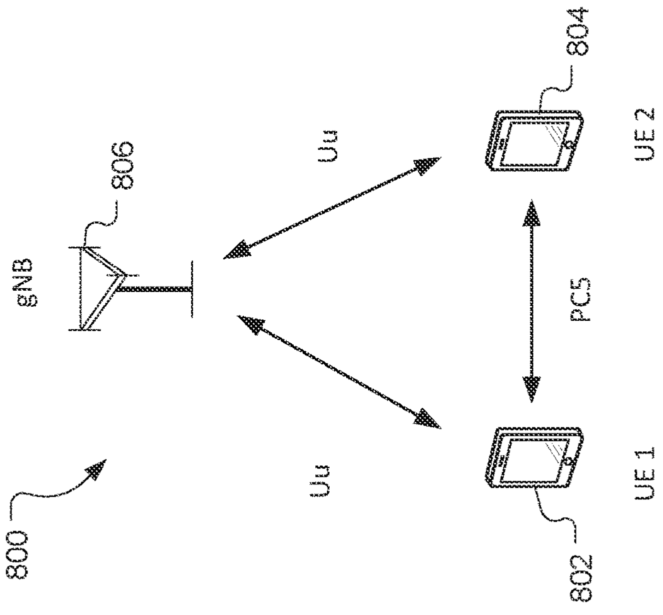
FIGS. 8A and 8B are diagrams of an example sidelink interface for discovery.
Figure 8B:
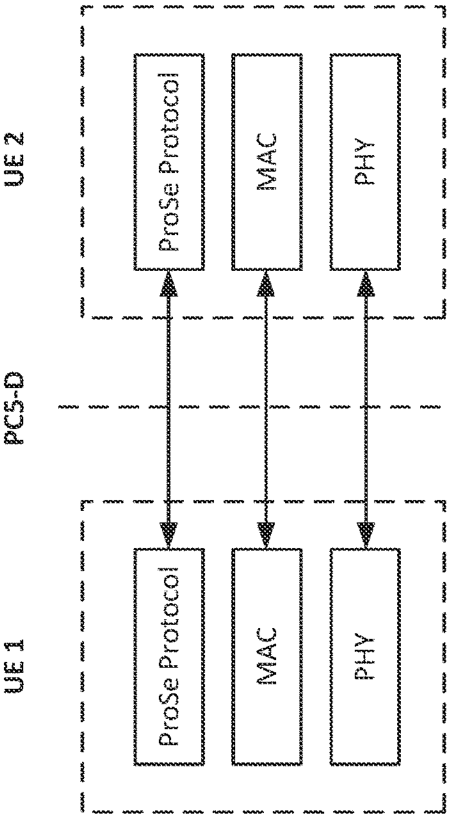

Referring to FIGS. 8A and 8B, diagrams of an example sidelink interface for discovery are shown. An example network 800 includes a base station 806, which may correspond to any combinations of the base stations described herein, a first UE 802 and a second UE 804, which may correspond to the UEs described herein. The network 800 may be based on a V2X communication schema, Industrial Internet of Things (IIOT), or other networks which enable communications between UE and base stations, as well as UE to UE (i.e., device-to-device (D2D) communications). For example, a V2X network utilizes two or more radio access technologies including a Uu radio interface, a radio interface that supports UE to base station communications, and a PC5 sidelink interface, a radio interface that supports UE to UE communications. Other radio access technologies (e.g., WiFi, Bluetooth, UWB, etc.) may be used to support UE to infrastructure communications and/or UE to UE communications.

In general, sidelink discovery procedures are utilized by a UE to find other proximate UE(s) directly using a radio access technology such as PC5. The sidelink discovery process may occur whether one or more of the participating UEs are in a network coverage area (e.g., the coverage area of the base station 806) or out of the network coverage area. Either the first UE 802 or the second UE 804 may be configured to initiate and/or respond in a sidelink discovery process. FIG. 8B is an example protocol stack based on the LTE V2X schema. Other discovery protocol stacks may also be used. In an example, a protocol stack for discovery may include just MAC and PHY layers. Upper layer interfaces, such as the proximity service (ProSe) protocol, may be used when the MAC sublayer receives a discovery message. In an example, the MAC layer may be configured to determine the radio resource to be used for announcing a reception of a discovery message from an upper layer and for generating the MAC protocol data unit (PDU) including a discovery message and sending the MAC PDU with no MAC header to the physical layer for transmission in the predetermined radio resources (see 3GPP TS 36.321). In an example, a UE may participate in announcing and monitoring of discovery message in both RRC IDLE and RRC_CONNECTED states such that the UE may be configured to announce and monitor discovery messages. In an example, the UE may be configured to utilize multiple different ranges. The ranges may be based into class values and the UE may be configured based on available transmission power, battery power, or other application and/or operational constraints. The range class information may be included in assistance data provided by a network resource, such as the base station or a location server (e.g., the LMF 120). The discovery process enables UEs to obtain UEIDs from proximate neighbors which are within range of one another. In an example, the UEs may be configured to change the range class to increase or decrease the number of proximate neighbors. For example, the range class may be decreased in a dense operating area where multiple UEs are operating in proximity to one another.

In addition to the sidelink discovery procedures, the UEs 802, 804 may be configured to utilize other sidelink physical layer channels and signals to send and receive reference and data signals. For example, the UES 802, 804 may be configured to utilize the physical sidelink shared channel (PSSCH), the physical sidelink control channel (PSCCH), the physical sidelink broadcast channel (PSBCH), the sidelink shared channel (SL-SCH), the sidelink broadcast channel (SL-BCH), and other sidelink synchronization signals. Other resource pools may be used to define the available subframe and resource blocks for sidelink transmission and/or reception. In an example, the UEs 802, 804 may be configured to obtain signal measurement values such as signal strength, timing, and angle related information from the sidelink signals. The available bandwidth for sidelink signals may increase with higher frequencies and new radio technologies, which may enable improved measurement capabilities with a potential increase in power consumption.

Figure 9A:
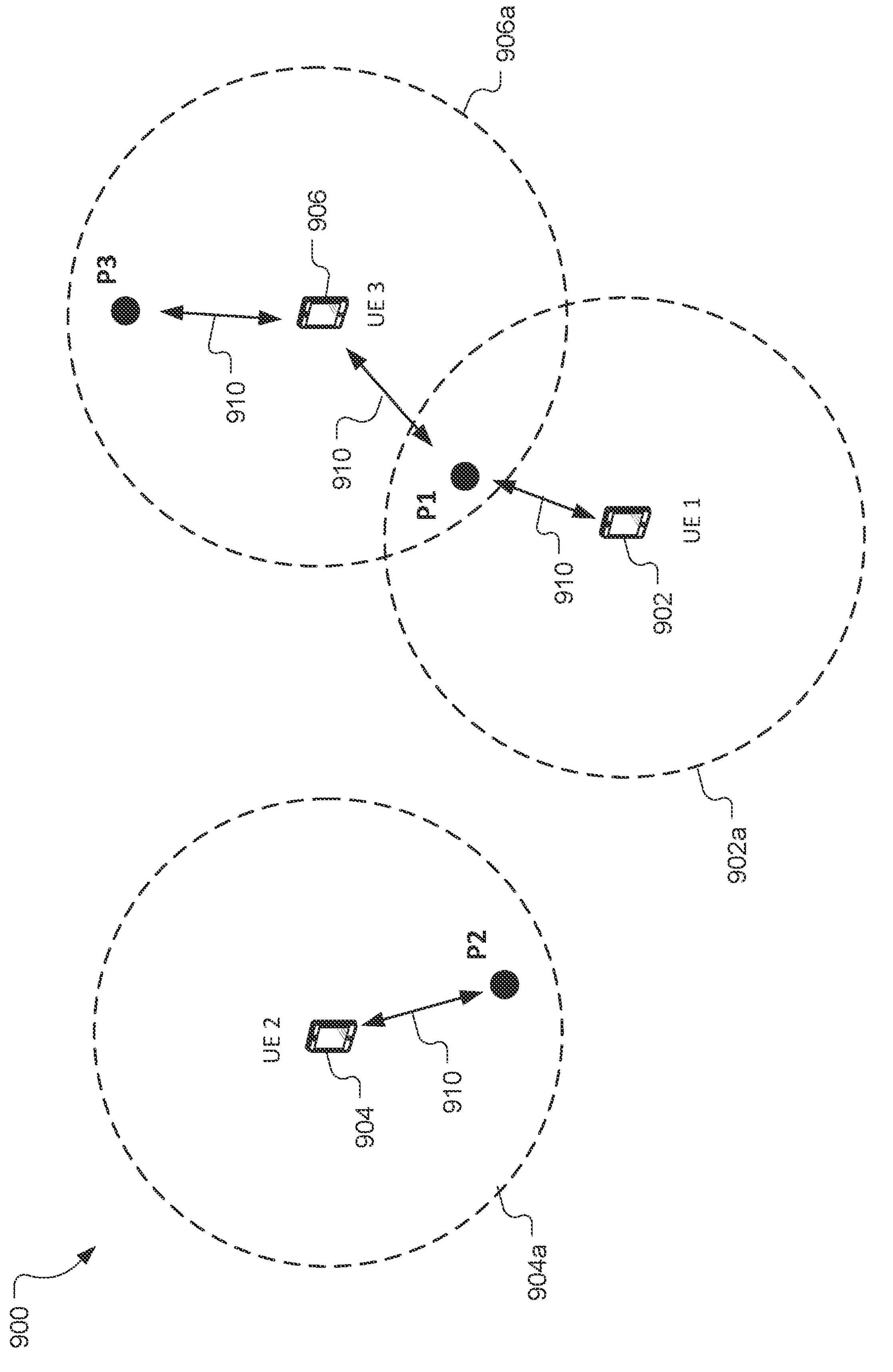
FIGS. 9A, 9B and 9C are example use case diagrams for sidelink user equipment identification positioning.
Figure 9B:
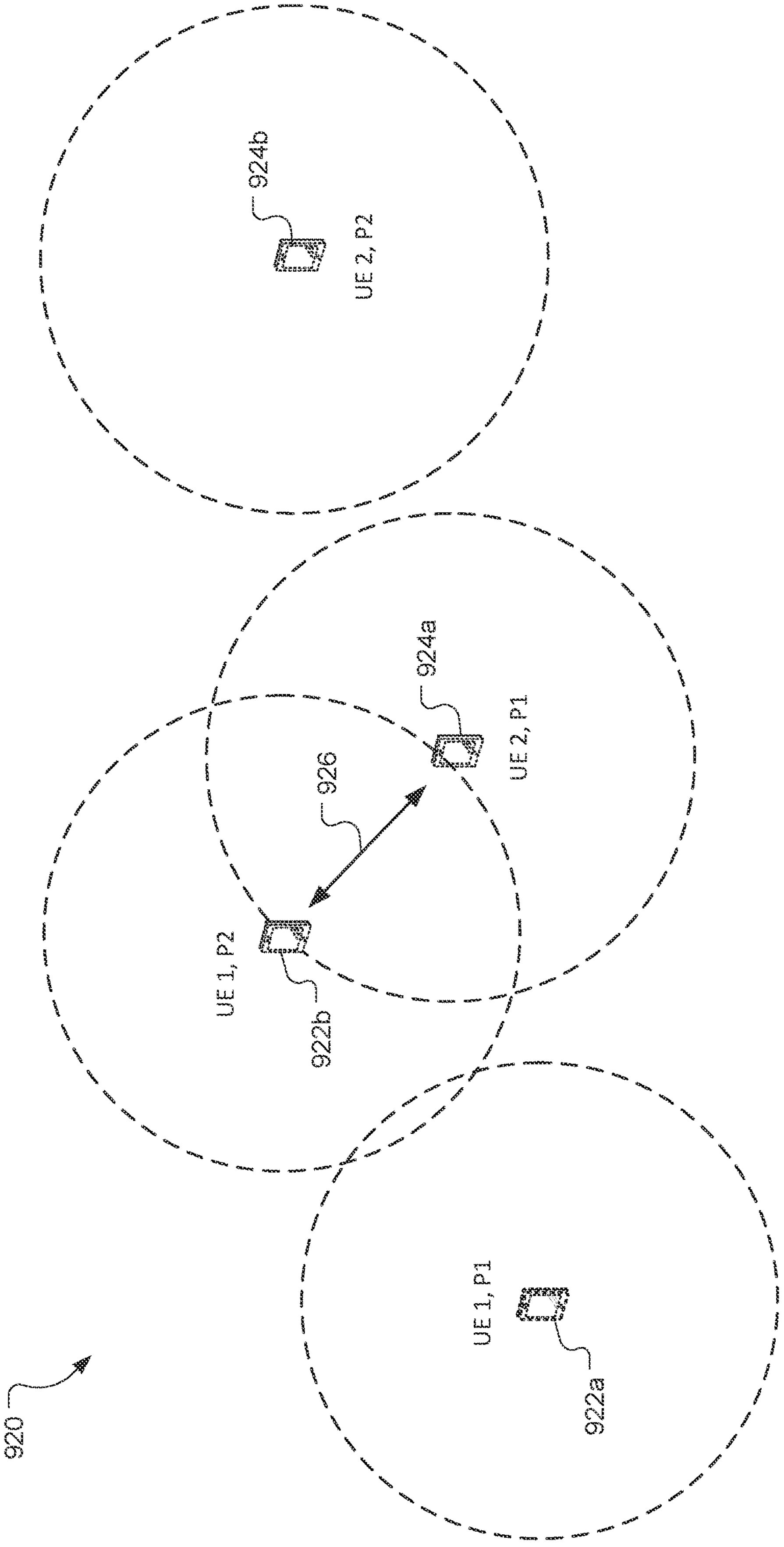
Figure 9C:
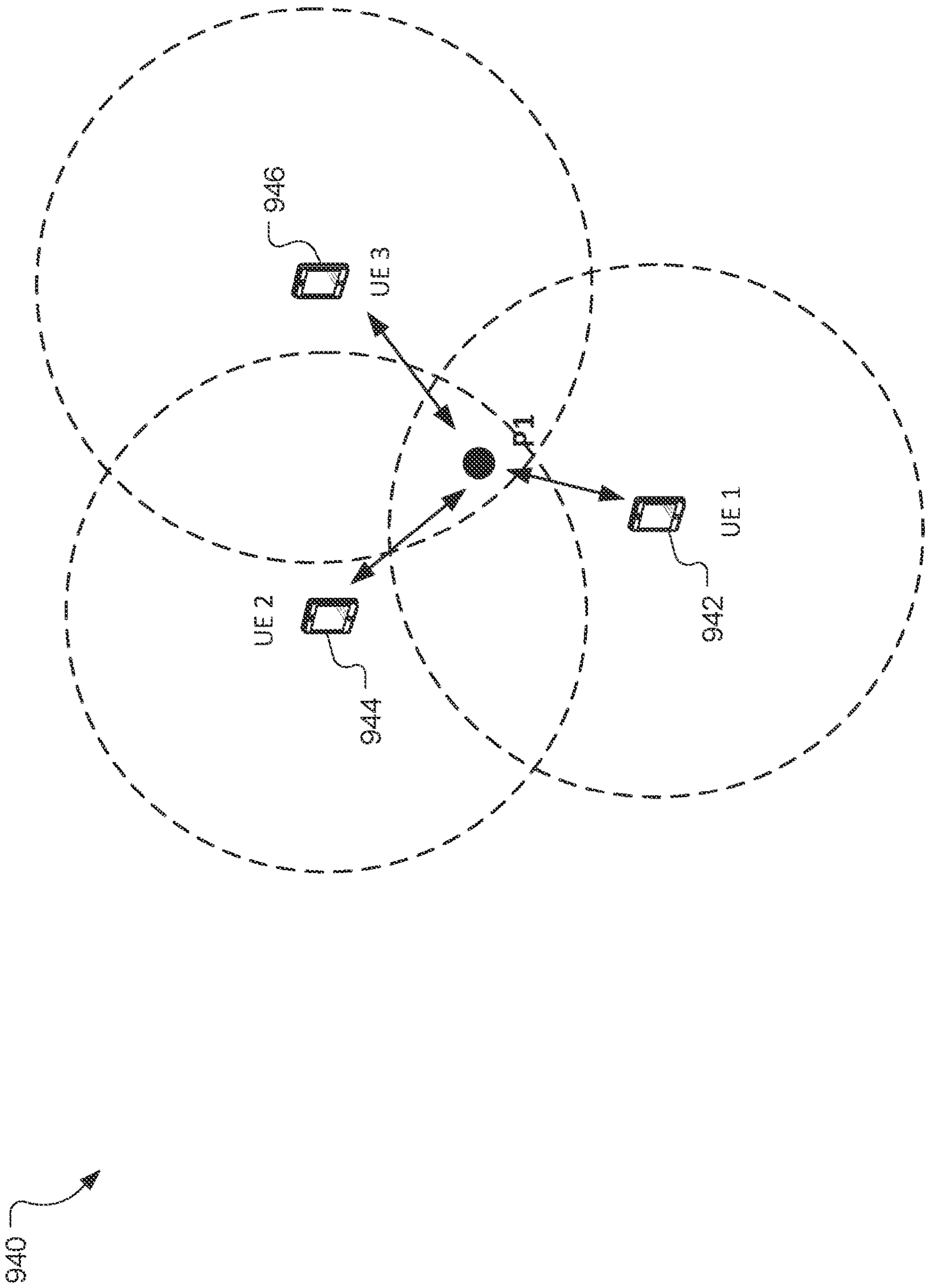

Referring to FIGS. 9A, 9B, and 9C, example use cases for sidelink user equipment identification (SL-UEID) positioning are shown. The use cases are examples and not limitations. A first example use case 900 in FIG. 9A includes a first UE 902, a second UE 904 and a third UE 906 configured for sidelink communication. The UEs 902, 904, 906 may correspond to the UEs described herein. The first UE 902 is configured to utilize sidelink communications within a first range 902*a*, the second UE 904 is configured to utilize sidelink communications within a second range 904*a*, and the third UE 906 is configured to utilize sidelink communications within a third range 906*a*. The number of UEs, the locations and ranges are examples and not limitations as other UEs and other ranges may be used. In an example, the ranges 902*a*, 904*a*, 906*a* may be in a range of 10 m to 100 m. Other range values may also be used based on the capabilities of the UEs. The locations of the UEs 902, 904, 906 are known. For example, the UEs 902, 904, 906 may be fixed reference stations, may be participating in a precise point positioning system or other satellite positioning systems, may have locations established by terrestrial positioning techniques, or combinations therein. Other positioning techniques may be used to establish the locations of the UEs 902, 904, 906. In an example, a location server such as the LMF 120 may be configured to maintain the locations in a data structure. The corresponding ranges 902*a*, 904*a*. 906*a* may also be known by the LMF 120 based on the corresponding range class utilized by the respective UEs 902, 904, 906, or based on other information maintained in a data structure.

In operation, a position for a fourth UE (not shown in FIG. 9A) has been computed to be one of three likely positions such as a first position P1, a second position P2 and a third position P3. The variations in the positions P1, P2, P3 may be based on the effects of NLOS signals such as described in FIG. 7A. Other environmental and computational limitations may also produce a variety of position estimates. The fourth UE may utilize a sidelink discovery procedure 910 to detect identification information of proximate neighbors and then utilize the identification information to reduce the ambiguity in the position estimates. At the discovery phase. UE identification information (UEID) may include a sidelink sequence ID (e.g., SL-SSS sequence ID), or other detectable information to identify the UE. After the discovery phase, the UEID may be other permanent or temporary identification information such as a cell global identifier (eCGI), international mobile equipment identity (IMEI), subscriber identity module (SIM), IMSI (International Mobile Subscriber Identity). SUPI (Subscription Permanent Identifier), Subscription Concealed Identifier (SUCI) or other radio network temporary identifiers (RNTIs) and upper level identification fields. In an example, the fourth UE may provide the neighbor identification information to a location server, such as the LMF 120, and the location server may be configured to utilize the UEIDs to determine the position of the fourth UE. For example, if the fourth UE detects both the first UE 902 and the third UE 906 via the sidelink discovery procedure 910, then the first position P1 may be used as the position of the fourth UE. If the fourth UE detects the second UE 904 alone via the sidelink discovery procedure 910, then the second position P2 may be used as the position of the fourth UE. Similarly, if the fourth UE detects the third UE 906, then the third position P3 may be used. In an example, the fourth UE may be further configured to perform signal measurements (e.g., RTT, RSSI, AoA, etc.) via the sidelink and provide the measurement values to the location server.

In a second example use case 920, depicted in FIG. 9B, the position estimates for multiple UEs may be used to reduce the ambiguity of the corresponding UE position estimates. For example, the position estimates associated with two or more UEs may be used in conjunction with the presence of sidelink communications between the UEs to select the position estimates. The second use case 920 includes a first UE which is associated with a first position estimate 922*a* and a second position estimate 922*b*, and a second UE which is associated with a third position estimate 924*a* and a fourth position estimate 924*b*. The position estimates 922*a-b*, 924*a-b* may be based on satellite and/or terrestrial navigation techniques such as RTT, RSSI, RSRP. ToA, AoD. OTDOA, etc. as previously discussed. The first UE and the second UE are utilizing a sidelink communication link 926 to discover one another and potentially perform sidelink measurement operations based on the sidelink communication link 926. Either the first UE or the second UE may report the UEID information obtained during the sidelink discovery process to a location server, and the location server may be configured to utilize the position estimates and the SL-UEID information to select corresponding position estimates for the UEs. For example, the presence of the sidelink communication link 926 may be used to select the second position estimate 922*a* for the first UE and the third position estimate 924*a* for the second UE since the other combinations would exceed the operational range of the sidelink communication link 926.

In a third example use case 940, the locations for one or more UEs are known and a coarse position estimate for a target UE may be determined based on a sidelink discovery procedure with one or more of the UEs. In an example, the target UE may utilize a single location of a neighbor UE as a coarse location. For example, the target UE could utilize the location of the first UE 942 as a coarse location. In another example, a coarse position for the target UE may be based on multiple neighbor UEs. For example, the locations of a first UE 942, a second UE 944 and a third UE 946 may be known by a network server, such as the LMF 120, or other network entities (e.g., the target UE). The target UE (not shown in FIG. 9C) may participate in a sidelink discovery procedure to determine the respective UEID (e.g., IMEI, SL-SSS sequence ID, eCGI, SIM, IMSI, SUPI, SUCI, etc.) for each of the UEs 942, 944, 946. The network server may utilize the UEID and location information to determine the intersection of the respective sidelink range areas for each of UEs 942, 944, 946 to determine the coarse position estimate for the target UE. In the example use case 940, the coarse position estimate for the target UE may be at a first position P1, which is located within the intersection of the sidelink range areas for each of the UEs 942, 944, 946 the target UE discovered via the sidelink discovery procedure. In an example, the target UE may be configured to perform sidelink measurements with the UEs 942, 944, 946 and refine the coarse position estimate based on the measurement values.

Figure 10A:
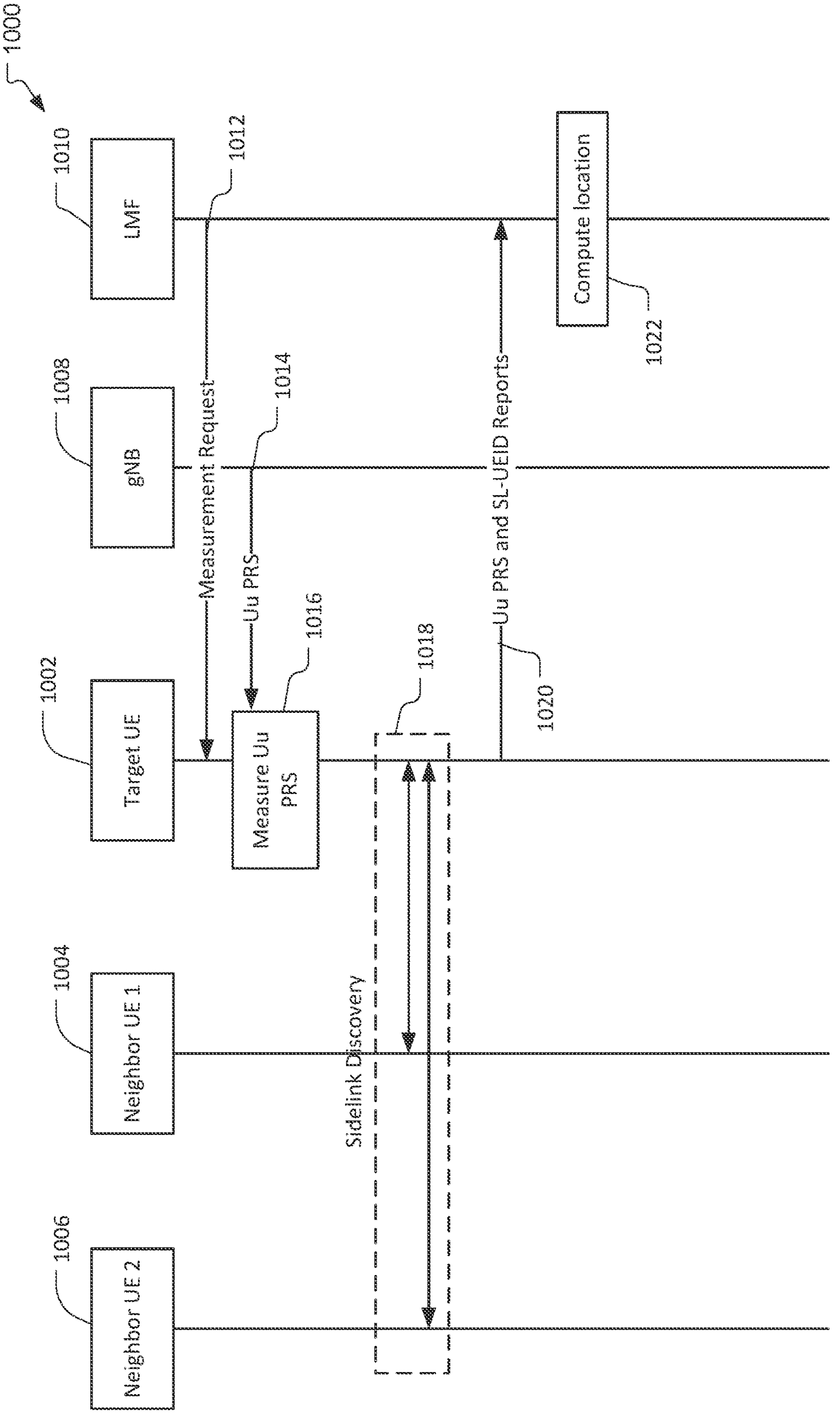
FIG. 10A is an example message flow for simultaneous reference signal and sidelink user equipment identification positioning.

Referring to FIG. 10A, an example message flow 1000 for simultaneous reference signal and sidelink user equipment identification positioning is shown. The example message flow 1000 includes a target UE 1002, a first neighbor UE 1004, and a second neighbor UE 1006. The UEs 1002, 1004, 1006 may correspond to UEs described herein. The number and configurations of the neighbor UEs is an example as additional neighbor UEs with various configurations and capabilities may also be used. The message flow includes a base station, such as the gNB 1008 which may correspond to the base stations described herein, and a network server, such as the LMF 1010. The LMF 1010 may correspond to the servers described herein. In an example, the LMF 1010 may be configured to send a measurement request message 1012 to the target UE 1002 to request that the target UE 1002 obtain position measurements and sidelink UEID information for proximate neighbors. The measurement request message 1012 may be in response to a client request (e.g., location service) and may include assistance data configured to enable the target UE 1002 to obtain positioning measurements. In an example, measurement requests and assistance data may be included in separate messages. The measurement request message 1012 and/or assistance data may indicate positioning reference signals the target UE 1002 may measure via a first radio access technology (e.g., LTE, 5G NR) in addition to a request to obtain UEIDs and/or measurements via a second radio access technology (e.g., sidelink). The LMF 1010 may utilize network protocols such as LPP/LPPa to communicate with the target UE 1002. Other protocols, such as RRC via the gNB 1008, may also be used. In an example, the measurement request message 1012 is provided to the target UE 1002 via one or more NAS LPP messages.

The gNB 1008, and other base stations in the network, may transmit DL PRS such as the Uu PRS 1014. The Uu PRS 1014 may be omni-directional or directional PRS (e.g., based on beamforming) and may be based on PRS resources and PRS resource sets in a positioning frequency layer associated with the communications network. At stage 1016, the target UE 1002 is configured to obtain measurement values based on the Uu PRS 1014 transmitted by the gNB 1008 and other Uu PRS transmitted by other base stations (not shown in FIG. 10A). The measurement values may include ToA, RSTD, AoA, RSSI, TDoA, OTDOA, E-CID. RSRP, RSRQ, etc. In an example, the target UE 1002 may be configured to transmit an UL PRS to one or more base stations to measure RTT. The target UE 1002 may be configured to perform a sidelink discovery procedure 1018 to obtain UEIDs for proximate neighbor UEs, such as the first neighbor UE 1004 and the second neighbor UE 1006. The sidelink discovery procedure 1018 may be based on the PC5 interface, or other D2D interfaces. In the discovery phase of the sidelink communication, the UEIDs may correspond to the IMEI, SL-SSS sequence IDs, or other detectable information (e.g., SIM, IMSI, SUPI, SUCI, etc.) to identify the neighbor UEs 1004, 1006 to the LMF 1010. The sidelink communication may utilize available interfaces and signals such as PSCCH, PSSCH, PSBCH, SL-CSIRS, PSFCH, SCI, SL-SSB etc. In an example, the target UE 1002 may be configured to obtain signal measurements via the sidelink communications with the neighbor UEs 1004, 1006. For example, the sidelink signal measurement values may include RSRP, RSRQ, timestamp related measurements (e.g., ToA, RTT) as well as angle related measurements (AoA, AoD). In an example, the measurement request message 1012, or other assistance data, provided by the LMF 1010 may provide an indication of the proximate neighbor UEs to the target UE 1002, and the target UE 1002 may be configured to search for the indicated neighbor UEs. The LMF 1010 may also be configured to provide location information for the proximate neighbor UEs, and the target UE 1002 may be configured to compute a location based on the Uu PRS measurements and the known locations of the neighboring UEs.

The target UE 1002 may provide one or more Uu PRS and SL-UEID report messages 1020 to the LMF 1010. The report messages 1020 may include the Uu PRS measurements obtained at stage 1016 and the UEIDs obtained via the sidelink discovery procedure 1018. In an example, the report may also include sidelink measurement values obtained by the target UE 1002. The report messages 1020 may utilize NAS LPP, or other protocols to provide the measurement information to the LMF 1010, or to another network entity configured to calculate a position based on the measurements obtained by the target UE 1002. At stage 1022, the LMF 1010 may be configured to determine a location of the target UE 1002 based on the Uu PRS measurements and SL-UEIDs provided in the one or more report messages 1020. For example, as depicted in FIGS. 9A-9C, the LMF 1010 may utilize the known locations of the neighbor UEs 1004, 1006 to reduce the position ambiguity associated with the Uu PRS measurements. The LMF 1010 may provide the computed location estimate to the target UE 1002 or other client devices and/or applications as required.

Figure 10B:
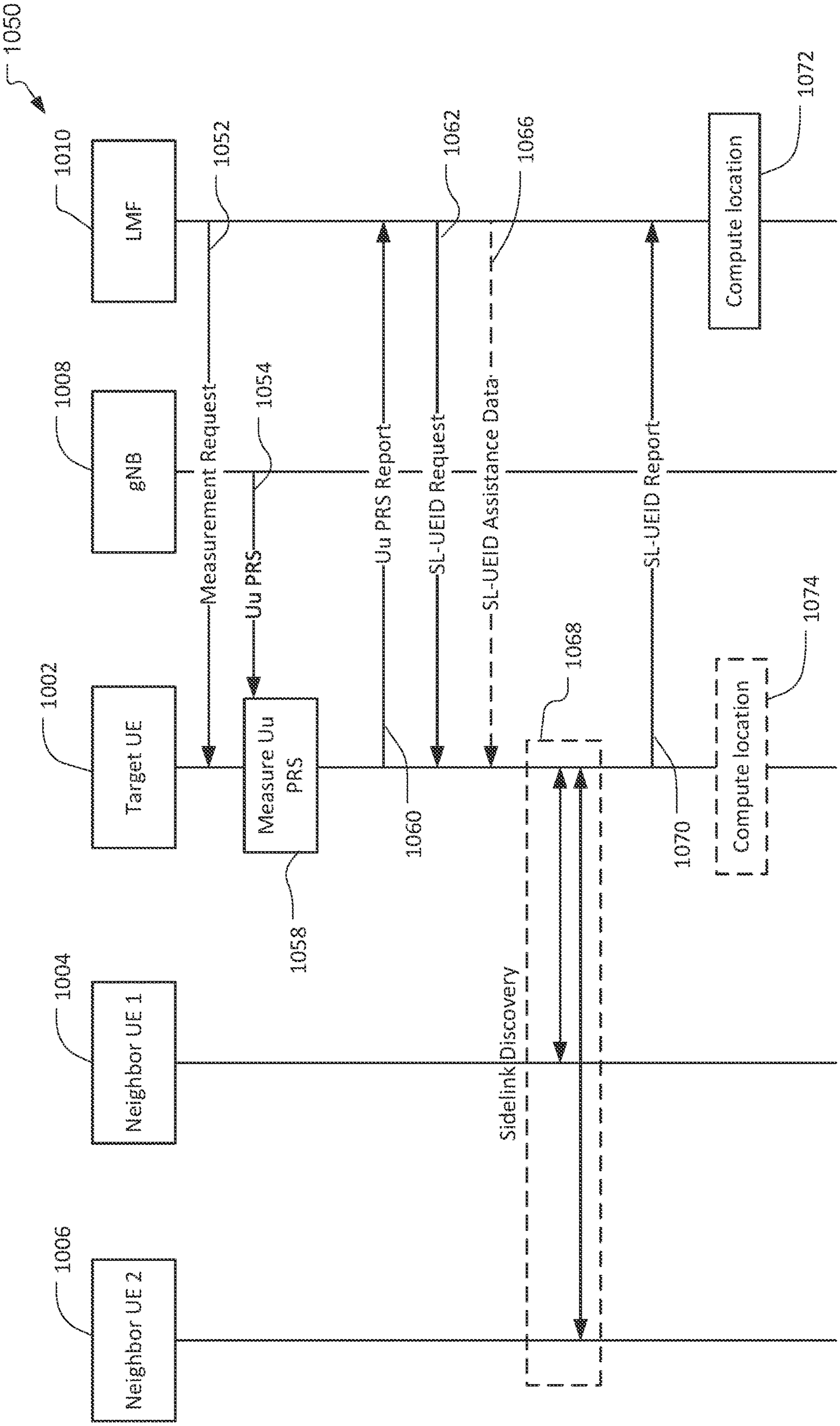
FIG. 10B is an example message flow for sequential reference signal and sidelink user equipment identification positioning.

Referring to FIG. 10B, an example message flow 1050 for sequential reference signal and sidelink user equipment identification positioning is shown. The example message flow 1050 may include the target UE 1002, neighbor UEs, 1004, 1006, the gNB 1008 and the LMF 1010 as described in FIG. 10A. The LMF 1010 may provide one or more measurement request messages 1052 to the target UE 1002 to initiate a positioning session. For example, the one or more measurement request messages 1052 may include Uu PRS information to enable the target UE 1002 to measure one or more Uu PRS 1054 transmitted by the gNB 1008 and other stations. At stage 1058, the target UE 1002 may be configured to obtain measurements based at least in part on the Uu PRS transmissions (e.g., ToA, RSTD, OTDOA, RTT, AoA, AoD, RSRP etc.) and provide the measurement values to the LMF 1010 via one or more Uu PRS report messages 1060. The communications between the LMF 1010 and the target UE 1002 may utilize network protocols such as NAS LPP/LPPa. The LMF 1010 may subsequently send one or more SL-UEID request messages 1062 to instruct the target UE 1002 to perform a sidelink discovery procedure. For example, the LMF 1010 may be configured to resolve position ambiguity associated with the measurement values obtained at stage 1058 based on location information associated with neighboring UEs, such as the first neighbor UE 1004 and the second neighbor UE 1006. In an example, the LMF 1010 may be configured to provide one or more SL-UEID assistance data messages 1066 to enable the target UE 1002 to communicate with neighboring UEs and optionally derive a position based on SL measurements. For example, the SL-UEID assistance data messages 1066 may include location information for the neighboring UEs and other parameters, such as range class information, to enable the target UE 1002 to determine a range to one or more neighboring UEs.

The target UE 1002 may be configured to perform a sidelink discovery procedure 1068 to obtain UEIDs for proximate neighbor UEs, such as the first neighbor UE 1004 and the second neighbor UE 1006. The sidelink discovery procedure 1068 may be based on one or more D2D interfaces, such as the PC5 interface. The discovered SL-UEIDs may correspond to the IMEI, SL-SSS sequence IDs, or other detectable information (e.g., SIM, IMSI, SUPI, SUCI, etc.) to identify the neighbor UEs 1004, 1006 to the LMF 1010. The sidelink communication may utilize available interfaces and signals such as PSCCH, PSSCH, PSBCH, SL-CSIRS, PSFCH, SCI, SL-SSB etc. In an example, the one or more SL-UEID request messages 1062 may instruct the target UE 1002 to obtain signal measurements via the sidelink communications with the neighbor UEs 1004, 1006. For example, the sidelink signal measurement values may include RSRP, RSRQ, timestamp related measurements (e.g., ToA, RTT) as well as angle related measurements (AoA, AoD) based on sidelink exchanges between the target UE 1002 and the respective neighbor UEs 1004, 1006. The target UE 1002 may provide one or more SL-UEID report messages 1070 to the LMF 1010. The report messages 1070 may include the UEIDs obtained via the sidelink discovery procedure 1068, and optionally the sidelink measurement values obtained by the target UE 1002. The report messages 1070 may utilize NAS LPP, or other protocols to provide the UEID and measurement information to the LMF 1010, or to another network entity configured to calculate a position based on the measurements obtained by the target UE 1002. At stage 1072, the LMF 1010 may be configured to determine a location of the target UE 1002 based on the values included in the one or more Uu PRS report messages 1060 and the values in the one or more SL-UEID report messages 1070, such as described in FIGS. 9A-9C. In an example, at stage 1074, the target UE 1002 may be configured to compute a location based on the Uu PRS measurements obtained at stage 1058, the UEIDS obtained via the sidelink discovery procedure 1068, and assistance data received from the LMF 1010. The target UE 1002 may also be configured to utilize any sidelink signal measurements obtained via the neighboring UEs in the location computations.

Figure 10C:
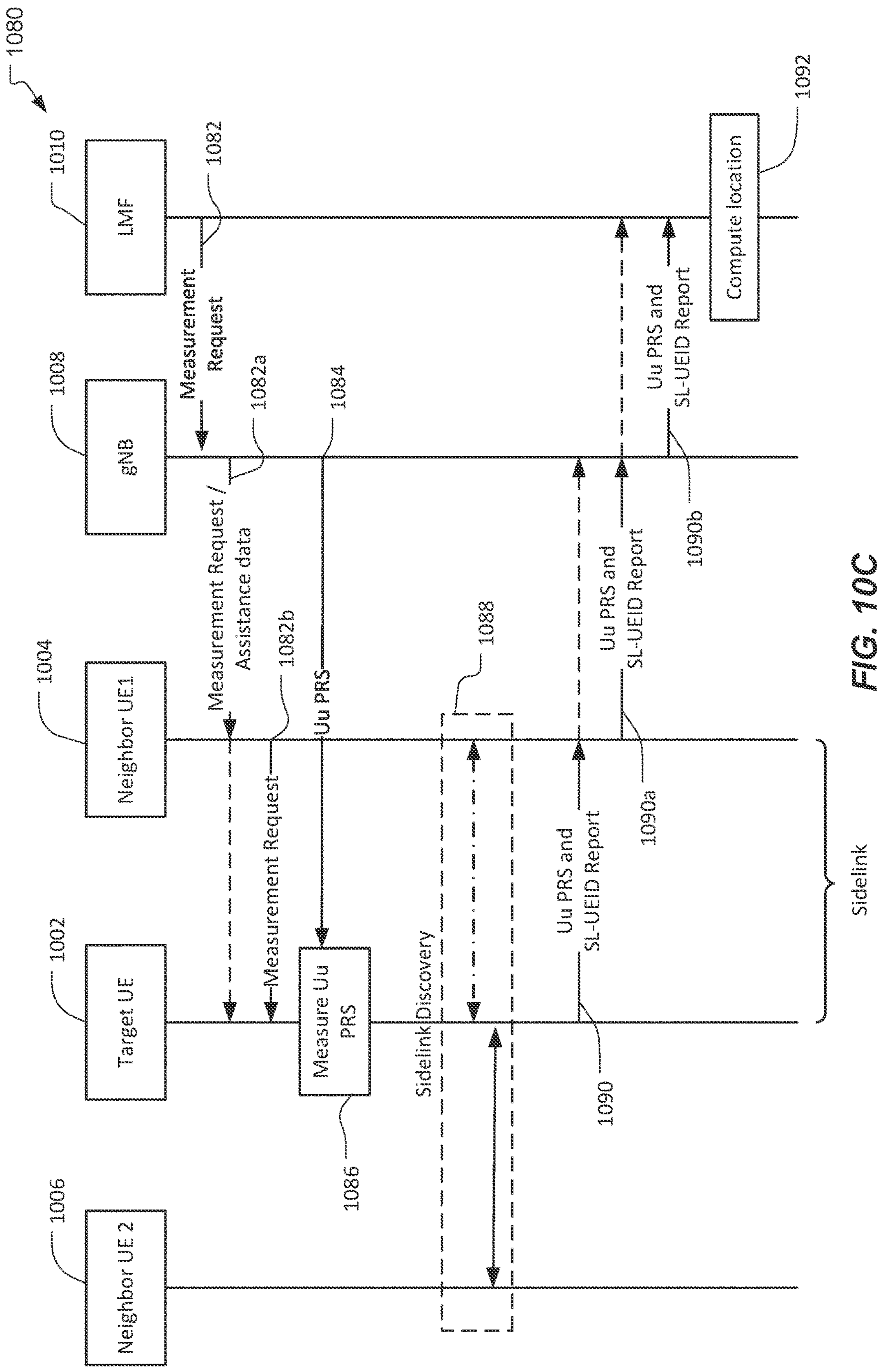
FIG. 10C is an example message flow including device-to-device messaging for reference signal and sidelink user equipment identification positioning.

Referring to FIG. 10C, an example message flow 1080 including device-to-device messaging for reference signal and sidelink user equipment identification positioning is shown. The example message flow 1050 may include the target UE 1002, neighbor UEs, 1004, 1006, the gNB 1008 and the LMF 1010 as described in FIG. 10A. The number and configurations of the neighbor UEs is an example as additional neighbor UEs with various configurations and capabilities may also be used. In an example, the LMF 1010 may be configured to send a measurement request message 1082 to the gNB 1008 to request that the target UE 1002 obtain position measurements and/or sidelink UEID information for proximate neighbors. The measurement request message 1082 may include assistance data configured to enable the target UE 1002 to obtain positioning measurements. In an example, the LMF 1010 may be configured to provide assistance data and the measurement request message 1082 to the target UE 1002 directly via LPP. In an example, the assistance data and the measurement request message 1082 may be routed through a serving gNB (e.g., the gNB 1008) and/or one or more neighboring UEs (e.g., the neighbor UE 1004), such as when the target UE 1002 is out of the coverage area and an in-coverage neighbor UE (e.g., the neighbor UE 1004) is relaying data communications between the network and the target UE 1002. In an example, measurement requests and assistance data may be obtained by the gNB 1008 in separate messages and/or with different technologies. In an example, the gNB 1008 may be configured to receive measurement requests via a Uu interface and a sidelink interface (e.g., PC5). The measurement request message 1082 and/or assistance data may indicate positioning reference signals the target UE 1002 may measure via a first radio access technology (e.g., LTE, 5G NR) in addition to a request to obtain UEIDs and/or measurements via a second radio access technology (e.g., sidelink). The LMF 1010 may utilize network protocols such as NRPP to communicate with the gNB 1008. In an example, the gNB 1008 may provide a measurement request message and/or assistance data messages 1082*a* to a neighboring UE such as the first neighbor UE 1004. Other protocols, such as RRC may also be used. The first neighbor UE 1004 may be configured to provide a measurement request message and/or assistance data messages 1082*b* to the target UE 1002 via a sidelink channel (e.g., PSCCH, PSSCH, etc.). In an example, the gNB 1008 may be the serving cell for the target UE 1002 and may provide the measurement request message and/or assistance data messages 1082*a* to the target UE 1002 directly (i.e., without relaying through a neighboring UE).

The gNB 1008, and other base stations in the network, may transmit DL PRS such as the Uu PRS 1084. The Uu PRS 1084 may be omni-directional or directional PRS (e.g., based on beamforming) and may be based on PRS resources and PRS resource sets in a positioning frequency layer associated with the communications network. At stage 1086, the target UE 1002 is configured to obtain measurement values based on the Uu PRS 1084 transmitted by the gNB 1008 and other Uu PRS transmitted by other base stations (not shown in FIG. 10C). The measurement values may include ToA, RSTD, AoA, RSSI, TDoA. OTDOA, E-CID, RSRP, RSRQ, etc. In an example, the target UE 1002 may be configured to transmit an UL PRS to one or more base stations to measure RTT. The target UE 1002 may be configured to perform a sidelink discovery procedure 1088 to obtain UEIDs for proximate neighbor UEs, such as the first neighbor UE 1004 and the second neighbor UE 1006. The sidelink discovery procedure 1088 may be based on the PC5 interface, or other D2D interfaces. In the discovery phase of the sidelink communication, the UEIDs may correspond to the IMEI. SL-SSS sequence IDs, or other detectable information (e.g., SIM, IMSI, SUPI, SUCI, etc.) to identify, the neighbor UEs 1004, 1006 to the LMF 1010. The sidelink communication may utilize available interfaces and signals such as PSCCH, PSSCH, PSBCH, SL-CSIRS, PSFCH, SCI, SL-SSB etc. In an example, the target UE 1002 may be configured to obtain signal measurements via the sidelink communications with the neighbor UEs 1004, 1006. For example, the sidelink signal measurement values may include RSRP. RSRQ, times related measurements (e.g., ToA, RTT) as well as angle related measurements (AoA, AoD). In an example, the measurement request message and/or assistance data messages 1082*a*, 1082*b*, provided by the gNB 1008 or the first neighbor UE 1004 may provide an indication of the proximate neighbor UEs to the target UE 1002, and the target UE 1002 may be configured to search for the indicated neighbor UEs. The assistance data may include identification information and location information for the proximate neighbor UEs, and the target UE 1002 may be configured to compute a location based on the Uu PRS measurements and the known locations of the neighboring UEs.

The target UE 1002 may provide one or more Uu PRS and SL-UEID report messages 1090 to the first neighbor UE 1004 via sidelink and/or the gNB 1008 via LPP, RRC or other protocols. The report messages 1090 may include the Uu PRS measurements obtained at stage 1086 and the UEIDs obtained via the sidelink discovery procedure 1088. In an example, the report may also include sidelink measurement values obtained by the target UE 1002. In an example, the first neighbor UE 1004 may send the Uu PRS and SL-UEID report messages 1090*a* to the gNB 1008 or the LMF 1010. The gNB 1008 may be configured to send the Uu PRS and SL-UEID report messages 1090*b* to the LMF 1010. At stage 1092, the LMF 1010 may be configured to determine a location of the target UE 1002 based on the Uu PRS measurements and SL-UEIDs provided in the one or more report messages 1090*a*, 1090*b*.

While the message flow 1080 utilizes D2D sidelink messaging to implement simultaneous reference signal and sidelink user equipment identification positioning, the message flow 1080 may be modified to utilize D2D sidelink messaging to implement sequential reference signal and sidelink user equipment identification positioning. In an example, the SL-UEID may be used in an extension of prior ECID reporting protocols. For example, prior ECID procedures required reporting the serving cell because the prior procedures do not cover sidelink capabilities, and UEs which may be out of a station coverage area. The methods provided herein improve and extend the prior ECID procedures by enabling the reporting of the serving cell to be optional when the target UE 1002 is out of coverage from a base station, but connected with the neighbor UE 1004 via a D2D sidelink. The neighbor UE 1004 may be configured to relay to the target UE 1002 via D2D sidelink.

Figure 11:
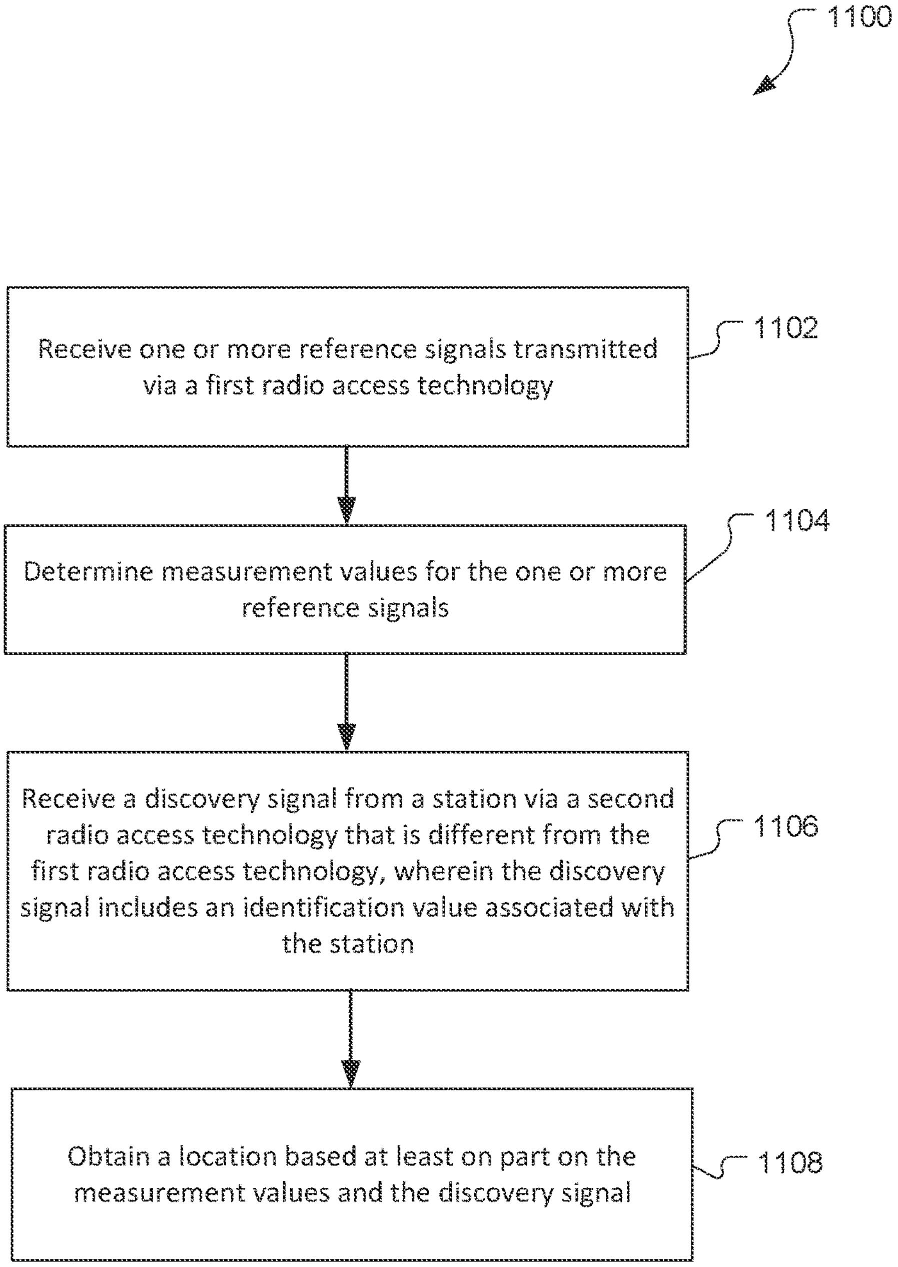
FIG. 11 is a block flow diagram of an example method performed at a user equipment for determining a position based on reference signal and sidelink user equipment identification information.

Referring to FIG. 11, with further reference to FIGS. 1-10C, a method 1100 performed at a user equipment for determining a position based on sidelink user equipment identification information includes the stages shown. The method 1100 is, however, an example and not limiting. The method 1100 may be altered, e.g., by having stages added, removed, rearranged, combined, performed concurrently, and/or having single stages split into multiple stages. For example, one or more stages may occur before, and/or one or more stages may occur after, the stages shown in FIG. 11. For example, a discovery signal received at stage 1106 may be received before the one or more reference signals at stage 1102.

At stage 1102, the method includes receiving one or more reference signals transmitted via a first radio access technology. The general-purpose processor 230 and the transceiver 215 may be a means for receiving the one or more reference signals. A UE 200, such as the target UE 1002, may be configured to receive DL PRS from one or more base stations such as the gNB 1008 via a first radio access technology such as LTE, 5G NR, or other wireless wide area network technologies. The DL PRS may be associated with PRS resources, PRS resource sets and corresponding network frequency layers. The first radio access technology may be associated with one or more frequency bands such as FR1 (410-7125 MHz), FR2 (24,250-52,600 MHz), sub 6 GHz, millimeter wave (mmW), and may utilize standardized parameters such as bandwidths, subcarrier spacing, modulation schemes, duplex modes, and multiple access schemes. Other reference signals may also be used for positioning a UE. For example, the reference signals may be one or more frames, such as fine timing frames (FTM), exchanged in a RTT positioning session.

At stage 1104, the method includes determining measurement values for the one or more reference signals. The general-purpose processor 230 and the transceiver 215 may be a means for determining the measurement values. In an example, the one or more reference signals may correspond to DL PRS transmitted by one or more base stations, and the UE 200 may be configured to obtain measurement values on the received beams. For example, the measurement values may be RSRP, RSRQ, RSSI, ToA, RSTD, AoA, ECID obtained from one or more received DL PRS. In an example, the UE 200 may be configured to perform an RTT exchange with one or more base stations and the measurement values may be based on the time differences.

At stage 1106, the method includes receiving a discovery signal from a station via a second radio access technology that is different from the first radio access technology, wherein the discovery signal includes an identification value associated with the station. The general-purpose processor 230 and the transceiver 215 may be a means for receiving the discovery signal. The second radio access technology may be a sidelink D2D communication interface such as the PC5 interface. In an example, the first radio access technology may be a cellular communication network (e.g., LTE, 5G NR, etc.) and the second radio access technology is a device-to-device communication interface (e.g., PC5 or other sidelink interfaces). The UE 200 may be configured to perform a sidelink discovery procedure to obtain UEIDs from neighboring stations. The neighboring stations may be other UEs, base stations or other wireless nodes configured to communicate via the second radio access technology. In a V2X network, the neighboring stations may be a roadside unit (RSU). A protocol stack for discovery may include just MAC and PHY layers, and/or one or more upper layer interfaces, such as proximity-based service (e.g., ProSe protocol). The MAC layer may be configured to determine the radio resource to be used for announcing a reception of a discovery message from an upper layer and for generating a MAC PDU including a discovery message and sending the MAC PDU with no MAC header to the physical layer for transmission in the predetermined radio resources (see 3GPP TS 36.321). The identification value associated with the station may be a UEID such as a sidelink sequence ID (e.g., IMEI, SL-SSS sequence ID) or other detectable information (e.g., SIM, IMSI, SUPI, SUCI, etc.) to identify the station.

At stage 1108, the method includes obtaining a location based at least in part on the measurement values and the discovery signal. The general-purpose processor 230 and the transceiver 215 may be a means for obtaining the location. In an example, the UE 200 may provide the measurement values determined at stage 1104 and the identification value received at stage 1106 to a network entity such as the LMF 120. For example, the UE 200 may be configured to provide the measurement and identification values to the LMF 120 via one or more LPP/LPPa protocol based messages. The LMF 120 may compute a location of the UE 200 based on the received messages, and the UE 200 may obtain the location from the LMF 120. In an example, the LMF 120 may provide one or more assistance data messages to the UE 200 configured to enable the UE 200 to compute a location locally. For example, the assistance data may include station location information, range class information, beam identifications and parameters (e.g., angles, power settings, offsets, etc.), and other parameters which may be used in the location computations. In an example, the method 1100 may include receiving one or more sidelink reference signals transmitted by the neighboring UEs via the second radio access technology, determining sidelink measurement values such as RSRP, RSRQ, RTT, etc. for the one or more sidelink reference signals, and obtaining the location based on the sidelink measurement values in combination with the measurement values determined at stage 1104.

Figure 12:
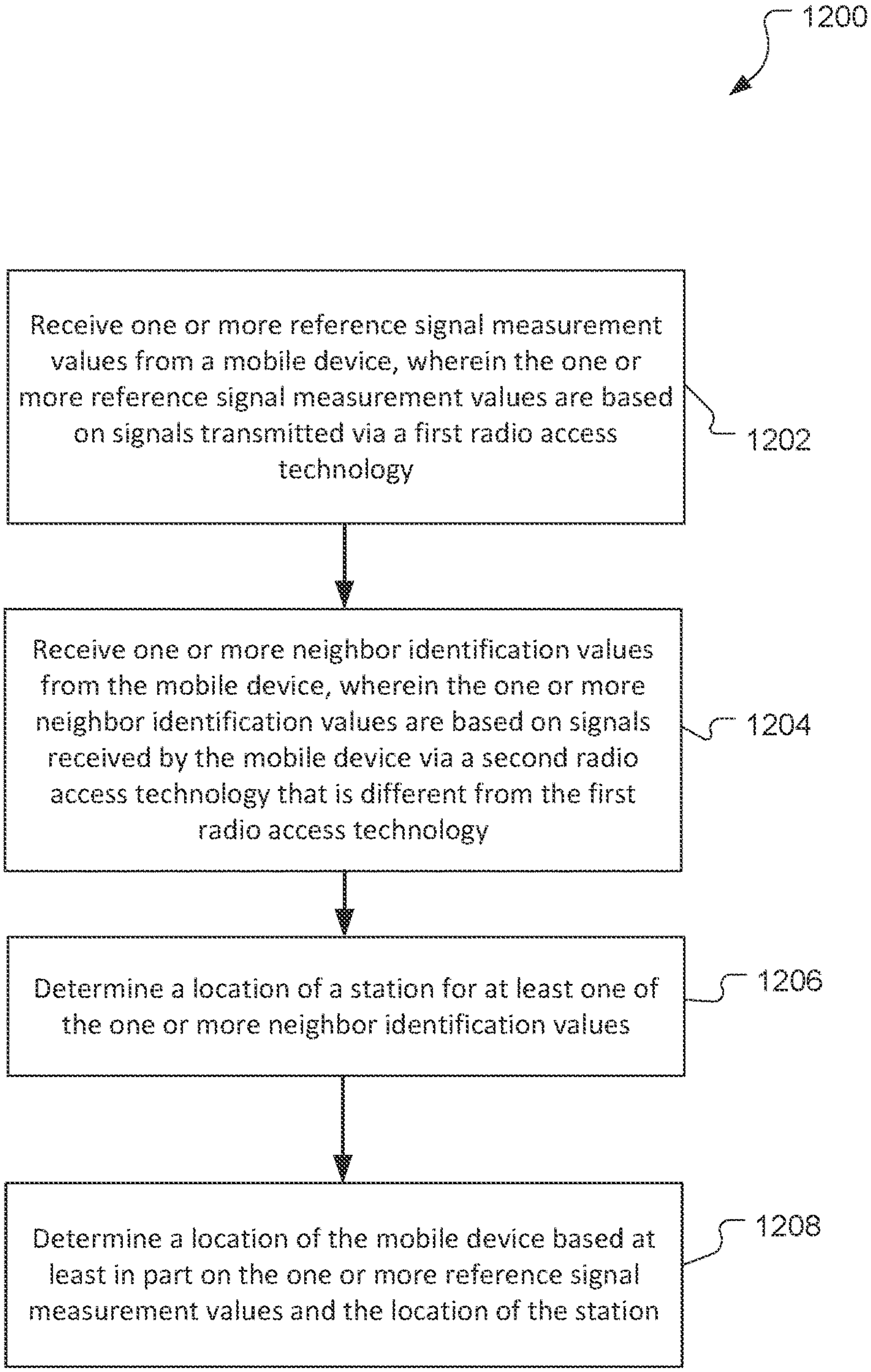
FIG. 12 is a block flow diagram of an example method performed at a location server for determining a position based on sidelink user equipment identification information.

Referring to FIG. 12, with further reference to FIGS. 1-10C, a method 1200 performed at a location server for determining a position based on sidelink user equipment identification information includes the stages shown. The method 1200 is, however, an example and not limiting. The method 1200 may be altered, e.g., by having stages added, removed, rearranged, combined, performed concurrently, and/or having single stages split into multiple stages. For example, one or more stages may occur before, and/or one or more stages may occur after, the stages shown in FIG. 12. For example, one or more neighbor identification values received at stage 1204 may be received before or simultaneously with the one or more reference signal measurements at stage 1202.

At stage 1202, the method includes receiving one or more reference signal measurement values from a mobile device, wherein the one or more measurement values are based on signals transmitted via a first radio access technology. A server 400, including a processor 410 and a transceiver 415 may be a means for receiving the one or more reference signal measurements. In an example, a network server such as the LMF 120 may receive reference signal measurement values obtained by a UE via a network connection. For example, the UE 200 may provide the measurement values via one or more Uu PRS and SL-UEID report messages 1020 an/or one or more Uu PRS report messages 1060. The messages may be provided via a network protocol configured to convey information elements from a UE to a network server, such as the LPP/LPPa protocol. Other messaging may also be used. The reference signal measurements may include RSRP, RSRQ, RSSI, ToA, RSTD, RTT, AoA. E-CID, and other values based on one or more received reference signals measured by the UE. The first radio access technology may be based on a communication system, such as LTE, 5G NR, or other wireless wide area network technologies, and one or more frequency bands such as FR1 (410-7125 MHz), FR2 (24,250-52,600 MHz), sub 6 GHz, and millimeter wave (mmW). Other operational parameters such as bandwidths, subcarrier spacing, modulation schemes, duplex modes, and multiple access schemes may be used to define a radio access technology.

At stage 1204, the method includes receiving one or more neighbor identification values from the mobile device, wherein the one or more neighbor identification values are based on signals received by the mobile device via a second radio access technology that is different from the first radio access technology. The processor 410 and the transceiver 415 may be a means for receiving the one or more neighbor identification values. In an example, the UE 200 may be configured to obtain the neighbor identification values via a sidelink discover process. The sidelink communication is an example of a second radio access technology. In an example, neighbor identification values may be a UEID such as a sidelink sequence ID (e.g., IMEI, SL-SSS sequence ID) or other detectable information (e.g., SIM, IMSI, SUPI, SUCI, etc.) to identify the station. The UE 200 may provide the neighbor identification values to the LMF 120 via one or more Uu PRS and SL-UEID report messages 1020 an/or one or more SL-UEID report messages 1070. Other messages may also be used to receive the one or more neighbor identification values. In an example, the UE 200 may be configured to obtain measurement values such as RSRP, RSRQ, RSSI, and RTT based at least in part on sidelink signals received from neighboring UEs. The measurement values may be included in the one or more Uu PRS and SL-UEID report messages 1020 an/or one or more SL-UEID report messages 1070.

At stage 1206, the method includes determining a location of a station for at least one of the one or more neighbor identification values. The processor 410 and the transceiver 415 may be a means for determining the location of a station. In an example, one or more network entities such as the LMF 120 and/or the AMF 115 may be configured to maintain the locations of UEs and other wireless nodes in the communication system 100. The neighbor identification values received at stage 1204 may be used to obtain the locations of the corresponding UEs from one or more network entities.

At stage 1208, the method includes determining a location of the mobile device based at least in part on the one or more reference signal measurement values and the location of the station. The processor 410 may be a means for determining the location of the mobile device. In an example, the LMF 120 may be configured to determine a location of the mobile device based on the Uu PRS measurements and SL-UEIDs provided in the one or more report messages received at stages 1202 and 1204. For example, as depicted in FIGS. 9A-9C, the LMF 120 may utilize mutlilateration techniques to obtain one or more position estimates for the mobile device, and the known locations of neighboring UEs determined at stage 1206 to reduce the position ambiguity associated with the one or more position estimates. In an example, the LMF 120 may be configured to provide the computed location estimate to the mobile device or other client devices and/or applications as required.

Figure 13:
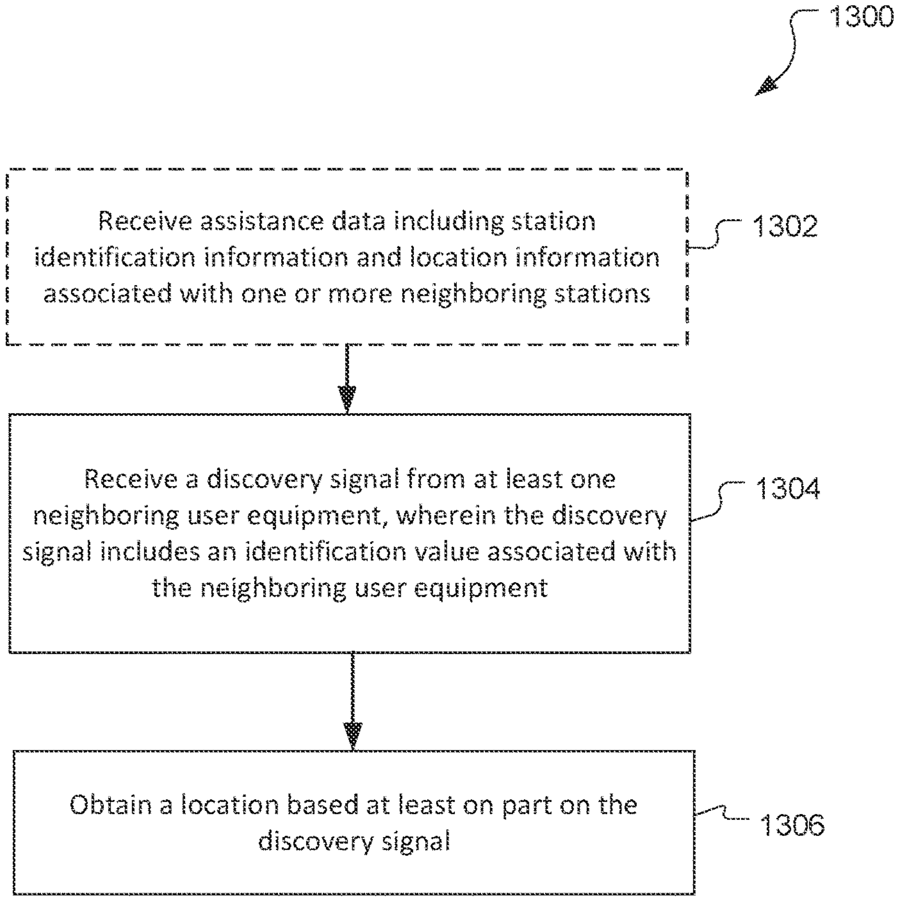
FIG. 13 is a block flow diagram of an example method performed at a user equipment for determining a position based on sidelink user equipment identification information.

Referring to FIG. 13, with further reference to FIGS. 1-10C, a method 1300 performed at a user equipment for determining a position based on sidelink user equipment identification information includes the stages shown. The method 1300 is, however, an example and not limiting. The method 1300 may be altered, e.g., by having stages added, removed, rearranged, combined, performed concurrently, and/or having single stages split into multiple stages. For example, receiving assistance data at stage 1302 is optional as the user equipment may include assistance data in local memory.

At stage 1302, the method optionally includes receiving assistance data including station identification information and location information associated with one or more neighboring stations. The general-purpose processor 230 and the transceiver 215 may be a means for receiving the assistance data. A UE 200, such as the target UE 1002, may be configured to receive assistance data from a network station such as the LMF 1010, the gNB 1008, a neighboring UE (i.e., via sidelink), or other wireless nodes in the network (e.g., a RSU in a V2X use case). In an example, the assistance data may include an indication of the proximate neighbor UEs to the target UE 1002, and the target UE 1002 may be configured to search for the indicated neighbor UEs. The assistance data may also include location information for the proximate neighbor UEs, and the target UE 1002 may be configured to compute a location based on the known locations of the neighboring UEs.

At stage 1304, the method includes receiving a discovery signal from at least one neighboring user equipment, wherein the discovery signal includes an identification value associated with the neighboring user equipment. The general-purpose processor 230 and the transceiver 215 may be a means for receiving the discovery signal. In an example, the discover signal may be received from a neighbor UE via a sidelink D2D communication interface such as the PC5 interface. In an example, the neighboring user equipment may be a base station and the discover signal may be received from base station (e.g., gNB) via the Uu interface. The target UE 1002 may be configured to perform a sidelink discovery procedure to obtain UEIDs from neighboring user equipment. The neighboring user equipment may be other wireless nodes configured to communicate via the second radio access technology. In a V2X network, the neighboring user equipment may be a roadside unit (RSU). A protocol stack for discovery may include just MAC and PHY layers, and/or one or more upper layer interfaces, such as proximity-based service (e.g., ProSe protocol). The MAC layer may be configured to determine the radio resource to be used for announcing a reception of a discovery message from an upper layer and for generating a MAC PDU including a discovery message and sending the MAC PDU with no MAC header to the physical layer for transmission in the predetermined radio resources (see 3GPP TS 36.321). The identification value associated with the station may be a UEID such as a sidelink sequence ID (e.g., IMEI, SL-SSS sequence ID) or other detectable information (e.g., SIM, IMSI, SUPI, SUCI, etc.) to identify the station.

At stage 1306, the method includes obtaining a location based at least in part on the discovery signal. The general-purpose processor 230 and the transceiver 215 may be a means for obtaining the location In an example, the target UE 1002 may receive, or have previously stored, assistance data associated with one or more neighboring stations. For example, the assistance data may include station identification and location information, range class information, beam identifications and parameters (e.g., angles, power settings, offsets, etc.), and other parameters which may be used in location computations. The location may be based determining a location of a single neighboring UE (i.e., the location of the neighboring UE may be used as the location for the target UE 1002). In an example, the location may be based on an intersection of coverage areas associated with a plurality of neighboring UEs. In an example, the method 1300 may include receiving one or more sidelink reference signals transmitted by the neighboring UEs via the second radio access technology, determining sidelink measurement values such as RSRP, RSRQ, RTT, etc. for the one or more sidelink reference signals, and obtaining the location based on the sidelink measurement values.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B. or C," or a list of "one or more of A, B. or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y. or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different features and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way). e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value. e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for determining a location of a mobile device, comprising: receiving one or more reference signals transmitted via a first radio access technology; determining measurement values for the one or more reference signals; receiving a discovery signal from a station via a second radio access technology that is different from the first radio access technology, wherein the discovery signal includes and identification value associated with the station; and obtaining the location based at least in part on the measurement values and the discovery signal.

Clause 2. The method of clause 1 wherein the first radio access technology is a cellular communication network and the second radio access technology is a device-to-device communication interface.

Clause 3. The method of clause 2 wherein the cellular communication network is a long term evolution network or a fifth generation new radio network, and the device-to-device communication interface is a PC5 interface.

Clause 4. The method of clause 1 wherein the identification value is an international mobile equipment identity value or a sidelink sequence identification value associated with the station.

Clause 5. The method of clause 1 wherein the measurement values include one of a reference signal received power, a reference signal received quality, a received signal strength indication, a time of arrival, and a round trip signal propagation time.

Clause 6. The method of clause 1 wherein the measurement values include a base station identification value or a beam identification value associated with at least one of the one or more reference signals.

Clause 7. The method of clause 1 further comprising transmitting the measurement values and the identification value associated with the station to a network server, wherein obtaining the location includes receiving the location from the network server.

Clause 8. The method of clause 7 wherein the measurement values and the identification value associated with the station are transmitted in single message.

Clause 9. The method of clause 1 further comprising: receiving one or more sidelink reference signals transmitted via the second radio access technology; determining sidelink measurement values for the one or more sidelink reference signals; and obtaining the location based at least in part on the sidelink measurement values.

Clause 10. The method of clause 1 further comprising receiving assistance data from a network server, and obtaining the location is based at least in part on the measurement values, the discovery signal, and the assistance data.

Clause 11. The method of clause 10 wherein the assistance data includes a location of the station and a range class associated with the station.

Clause 12. A method for determining a location of a mobile device, comprising: receiving one or more reference signal measurement values from the mobile device, wherein the one or more reference signal measurement values are based on signals transmitted via a first radio access technology; receiving one or more neighbor identification values from the mobile device, wherein the one or more neighbor identification values are based on signals received by the mobile device via a second radio access technology that is different from the first radio access technology; determining a location of a station for at least one of the one or more neighbor identification values; and determining the location of the mobile device based at least in part on the one or more reference signal measurement values and the location of the station.

Clause 13. The method of clause 12 wherein the first radio access technology is a cellular communication network and the second radio access technology is a device-to-device communication interface.

Clause 14. The method of clause 13 wherein the cellular communication network is a long term evolution network or a fifth generation new radio network, and the device-to-device communication interface is a PC5 interface.

Clause 15. The method of clause 12 wherein the one or more neighbor identification values include an international mobile equipment identity value or a sidelink sequence identification value associated with the station.

Clause 16. The method of clause 12 wherein the one or more reference signal measurement values include one of a reference signal received power, a reference signal received quality, a received signal strength indication, a time of arrival, and a round trip signal propagation time.

Clause 17. The method of clause 12 wherein the one or more reference signal measurement values include a base station identification value or a beam identification value associated with at least one of the signals transmitted via the first radio access technology.

Clause 18. The method of clause 12 wherein the one or more reference signal measurement values and the one or more neighbor identification values are received in single message.

Clause 19. The method of clause 12 further comprising: receiving one or more sidelink measurement values based on signals received by the mobile device via the second radio access technology; and determining the location based at least in part on the one or more sidelink measurement values.

Clause 20. The method of clause 12 further comprising providing assistance data to the mobile device, wherein the assistance data includes location information for one or more neighboring stations.

Clause 21. A method for determining a location of a mobile device, comprising: receiving a discovery signal from at least one neighboring station, wherein the discovery signal includes an identification value associated with the at least one neighboring station; and obtaining the location based at least in part on the discovery signal.

Clause 22. The method of clause 21 further comprising receiving assistance data including identification information and location information associated with one or more neighboring stations, wherein obtaining the location is based at least in part on the assistance data.

Clause 23. The method of clause 22 wherein the assistance data includes a range class associated with the at least one neighboring station.

Clause 24. The method of clause 22 wherein the identification information includes an international mobile equipment identity value, a subscription permanent identifier, a subscription concealed identifier, or a sidelink sequence identification value associated with the at least one neighboring station.

Clause 25. The method of clause 21 wherein the identification value is a sidelink sequence identification value associated with the at least one neighboring station.

Clause 26. The method of clause 21 further comprising transmitting the identification value associated with the at least one neighboring station to a network server, wherein obtaining the location includes receiving the location from the network server.

Clause 27. The method of clause 21 further comprising obtaining one or more sidelink measurement values based on one or more sidelink messages transmitted from the at least one neighboring station, wherein the one or more sidelink measurement values include one of a reference signal received power, a reference signal received quality, a received signal strength indication, a time of arrival, and a round trip signal propagation time.

Clause 28. The method of clause 21 further comprising transmitting the identification value associated with the at least one neighboring station to a network station via a sidelink, wherein obtaining the location includes receiving the location from the network station via the sidelink.

Clause 29. The method of clause 21 wherein the at least one neighboring station is a user equipment, and the discovery signal is received via a sidelink.

Clause 30. The method of clause 29 wherein the sidelink is a PC5 interface.

Clause 31. The method of clause 21 wherein the at least one neighboring station is abase station, and the discovery signal is received via a Uu interface.

Clause 32. An apparatus, comprising: a memory; at least one transceiver; at least one processor communicatively coupled to the memory and the at least one transceiver, and configured to: receive one or more reference signals transmitted via a first radio access technology; determine measurement values for the one or more reference signals; receive a discovery signal from a station via a second radio access technology that is different from the first radio access technology, wherein the discovery signal includes and identification value associated with the station; and obtain the location based at least in part on the measurement values and the discovery signal.

Clause 33. The apparatus of clause 32 wherein the first radio access technology is a cellular communication network and the second radio access technology is a device-to-device communication interface.

Clause 34. The apparatus of clause 33 wherein the cellular communication network is a long term evolution network of a fifth generation new radio network, and the device-to-device communication interface is a PC5 interface.

Clause 35. The apparatus of clause 32 wherein the identification value is an international mobile equipment identity value or a sidelink sequence identification value associated with the station.

Clause 36. The apparatus of clause 32 wherein the measurement values include one of a reference signal received power, a reference signal received quality, a received signal strength indication, a time of arrival, and a round trip signal propagation time.

Clause 37. The apparatus of clause 32 wherein the measurement values includes a base station identification value or a beam identification value associated with at least one of the one or more reference signals.

Clause 38. The apparatus of clause 32 wherein the at least one processor is further configured to transmit the measurement values and the identification value associated with the station to a network server, wherein obtaining the location includes receiving the location from the network server.

Clause 39. The apparatus of clause 32 wherein the at least on processor is further configured to: receive one or more sidelink reference signals transmitted via the second radio access technology; determine sidelink measurement values for the one or more sidelink reference signals; and obtain the location based at least in part on the sidelink measurement values.

Clause 40. An apparatus, comprising: a memory; at least one transceiver; at least one processor communicatively coupled to the memory and the at least one transceiver, and configured to: receive one or more reference signal measurement values from a mobile device, wherein the one or more reference signal measurement values are based on signals transmitted via a first radio access technology; receive one or more neighbor identification values from the mobile device, wherein the one or more neighbor identification values are based on signals received by the mobile device via a second radio access technology that is different from the first radio access technology; determine a location of a station for at least one of the one or more neighbor identification values; and determine a location of the mobile device based at least in part on the one or more reference signal measurement values and the location of the station.

Clause 41. The apparatus of clause 40 wherein the first radio access technology is a cellular communication network and the second radio access technology is a device-to-device communication interface.

Clause 42. The apparatus of clause 41 wherein the cellular communication network is a long term evolution network of a fifth generation new radio network, and the device-to-device communication interface is a PC5 interface.

Clause 43. The apparatus of clause 40 wherein the one or more neighbor identification values include an international mobile equipment identity value or a sidelink sequence identification value associated with the station.

Clause 44. The apparatus of clause 40 wherein the one or more reference signal measurement values include one of a reference signal received power, a reference signal received quality, a received signal strength indication, a time of arrival, and a round trip signal propagation time.

Clause 45. The apparatus of clause 40 wherein the at least one processor is further configured to: receive one or more sidelink measurement values based on signals received by the mobile device via the second radio access technology; and determine the location based at least in part on the one or more sidelink measurement values.

Clause 46. An apparatus, comprising: a memory; at least one transceiver; at least one processor communicatively coupled to the memory and the at least one transceiver, and configured to: receive a discovery signal from at least one neighboring station, wherein the discovery signal includes an identification value associated with the at least one neighboring station; and obtain a location based at least in part on the discovery signal.

Clause 47. The apparatus of clause 46 wherein the at least one processor is further configured to receive assistance data including identification information and location information associated with one or more neighboring stations, wherein obtaining the location is based at least in part on the assistance data.

Clause 48. The apparatus of clause 47 wherein the assistance data includes a range class associated with the at least one neighboring station.

Clause 49. The apparatus of clause 47 wherein the identification information includes an international mobile equipment identity value or a sidelink sequence identification value associated with the at least one neighboring station.

Clause 50. The apparatus of clause 46 wherein the identification value is a sidelink sequence identification value associated with the at least one neighboring station.

Clause 51. The apparatus of clause 46 wherein the at least one processor is further configured to obtain one or more sidelink measurement values based on one or more sidelink messages transmitted from the at least one neighboring station, wherein the one or more sidelink measurement values include one of a reference signal received power, a reference signal received quality, a received signal strength indication, a time of arrival, and a round trip signal propagation time.

Clause 52. The apparatus of clause 46 wherein the at least one processor is further configured to transmit the identification value associated with the at least one neighboring station to a network station via a sidelink, wherein obtaining the location includes receiving the location from the network station via the sidelink.

Clause 53. The apparatus of clause 46 wherein the at least one neighboring station is a user equipment, and the discovery signal is received via a sidelink.

Clause 54. The apparatus of clause 53 wherein the sidelink is a PC5 interface.

Clause 55. The apparatus of clause 46 wherein the at least one neighboring station is a base station, and the discovery signal is received via a Uu interface.

Clause 56. An apparatus for determining a location of a mobile device, comprising: means for receiving one or more reference signals transmitted via a first radio access technology; means for determining measurement values for the one or more reference signals; means for receiving a discovery signal from a station via a second radio access technology that is different from the first radio access technology, wherein the discovery signal includes and identification value associated with the station; and means for obtaining the location based at least in part on the measurement values and the discovery signal.

Clause 57. The apparatus of clause 56 further comprising means for transmitting the measurement values and the identification value associated with the station to a network server, wherein the means for obtaining the location includes means for receiving the location from the network server.

Clause 58. The apparatus of clause 56 further comprising: means for receiving one or more sidelink reference signals transmitted via the second radio access technology; means for determining sidelink measurement values for the one or more sidelink reference signals; and means for obtaining the location based at least in part on the sidelink measurement values.

Clause 59. The apparatus of clause 56 further comprising means for receiving assistance data from a network server, and means for obtaining the location based at least in part on the measurement values, the discovery signal, and the assistance data.

Clause 60. An apparatus for determining a location of a mobile device, comprising: means for receiving one or more reference signal measurement values from the mobile device, wherein the one or more reference signal measurement values are based on signals transmitted via a first radio access technology; means for receiving one or more neighbor identification values from the mobile device, wherein the one or more neighbor identification values are based on signals received by the mobile device via a second radio access technology that is different from the first radio access technology; means for determining a location of a station for at least one of the one or more neighbor identification values; and means for determining the location of the mobile device based at least in part on the one or more reference signal measurement values and the location of the station.

Clause 61. The apparatus of clause 60 further comprising: means for receiving one or more sidelink measurement values based on signals received by the mobile device via the second radio access technology; and means for determining the location based at least in part on the one or more sidelink measurement values.

Clause 62. The apparatus of clause 60 further comprising means for providing assistance data to the mobile device, wherein the assistance data includes location information for one or more neighboring stations.

Clause 63. An apparatus for determining a location of a mobile device, comprising: means for receiving a discovery signal from at least one neighboring station, wherein the discovery signal includes an identification value associated with the at least one neighboring station; and means for obtaining the location based at least in part on the discovery signal.

Clause 64. The apparatus of clause 63 further comprising means for receiving assistance data including identification information and location information associated with one or more neighboring stations, wherein the location is obtained based at least in part on the assistance data.

Clause 65. The apparatus of clause 63 further comprising means for transmitting the identification value associated with the at least one neighboring station to a network server, wherein the means for obtaining the location includes means for receiving the location from the network server.

Clause 66. The apparatus of clause 63 further comprising means for obtaining one or more sidelink measurement values based on one or more sidelink messages transmitted from the at least one neighboring station, wherein the one or more sidelink measurement values include one of a reference signal received power, a reference signal received quality, a received signal strength indication, a time of arrival, and a round trip signal propagation time.

Clause 67. The apparatus of clause 63 further comprising means for transmitting the identification value associated with the at least one neighboring station to a network station via a sidelink, wherein the means for obtaining the location includes means for receiving the location from the network station via the sidelink.

Clause 68. A non-transitory processor-readable storage medium comprising processor-readable instructions configured to cause one or more processors to determine a location of a mobile device, comprising: code for receiving one or more reference signals transmitted via a first radio access technology; code for determining measurement values for the one or more reference signals; code for receiving a discovery signal from a station via a second radio access technology that is different from the first radio access technology, wherein the discovery signal includes and identification value associated with the station; and code for obtaining the location based at least in part on the measurement values and the discovery signal.

Clause 69. The non-transitory processor-readable storage medium of clause 68 further comprising code for transmitting the measurement values and the identification value associated with the station to a network server, wherein the code for obtaining the location includes code for receiving the location from the network server.

Clause 70. The non-transitory processor-readable storage medium of clause 68 further comprising: code for receiving one or more sidelink reference signals transmitted via the second radio access technology; code for determining sidelink measurement values for the one or more sidelink reference signals; and code for obtaining the location based at least in part on the sidelink measurement values.

Clause 71. The non-transitory processor-readable storage medium of clause 68 further comprising code for receiving assistance data from a network server, and code for obtaining the location based at least in part on the measurement values, the discovery signal, and the assistance data.

Clause 72. A non-transitory processor-readable storage medium comprising processor-readable instructions configured to cause one or more processors to determine a location of a mobile device, comprising: code for receiving one or more reference signal measurement values from the mobile device, wherein the one or more reference signal measurement values are based on signals transmitted via a first radio access technology; code for receiving one or more neighbor identification values from the mobile device, wherein the one or more neighbor identification values are based on signals received by the mobile device via a second radio access technology that is different from the first radio access technology; code for determining a location of a station for at least one of the one or more neighbor identification values; and code for determining the location of the mobile device based at least in part on the one or more reference signal measurement values and the location of the station.

Clause 73. The non-transitory processor-readable storage medium of clause 72 further comprising: code for receiving one or more sidelink measurement values based on signals received by the mobile device via the second radio access technology; and code for determining the location based at least in part on the one or more sidelink measurement values.

Clause 74. The non-transitory processor-readable storage medium of clause 72 further comprising code for providing assistance data to the mobile device, wherein the assistance data includes location information for one or more neighboring stations.

Clause 75. A non-transitory processor-readable storage medium comprising processor-readable instructions configured to cause one or more processors to determine a location of a mobile device, comprising: code for receiving a discovery signal from at least one neighboring station, wherein the discovery signal includes an identification value associated with the at least one neighboring station; and code for obtaining the location based at least in part on the discovery signal.

Clause 76. The non-transitory processor-readable storage medium of clause 75 further comprising code for receiving assistance data including identification information and location information associated with one or more neighboring stations, wherein the code for obtaining the location is based at least in part on the assistance data.

Clause 77. The non-transitory processor-readable storage medium of clause 75 further comprising code for transmitting the identification value associated with the at least one neighboring station to a network server, wherein the code for obtaining the location includes code for receiving the location from the network server.

Clause 78. The non-transitory processor-readable storage medium of clause 75 further comprising code for obtaining one or more sidelink measurement values based on one or more sidelink messages transmitted from the at least one neighboring station, wherein the one or more sidelink measurement values include one of a reference signal received power, a reference signal received quality, a received signal strength indication, a time of arrival, and a round trip signal propagation time.

Clause 79. The non-transitory processor-readable storage medium of clause 75 further comprising code for transmitting the identification value associated with the at least one neighboring station to a network station via a sidelink, wherein the code for obtaining the location includes code for receiving the location from the network station via the sidelink.

The invention claimed is:

1. A method for determining a location of a mobile device, comprising:

receiving one or more reference signals transmitted via a first radio access technology;

determining measurement values for the one or more reference signals;

receiving a discovery signal from a station via a second radio access technology that is different from the first radio access technology, wherein the discovery signal includes an identification value associated with the station; and obtaining the location based at least in part on the measurement values and the identification value associated with the station indicated via the discovery signal.

2. The method of claim 1 wherein the first radio access technology is a cellular communication network and the second radio access technology is a device-to-device communication interface.

3. The method of claim 2 wherein the cellular communication network is a long term evolution network or a fifth generation new radio network, and the device-to-device communication interface is a PCS interface.

4. The method of claim 1 wherein the identification value is an international mobile equipment identity value or a sidelink sequence identification value associated with the station.

5. The method of claim 1 wherein the measurement values include one of a reference signal received power, a reference signal received quality, a received signal strength indication, a time of arrival, and a round trip signal propagation time.

6. The method of claim 1 wherein the measurement values include a base station identification value or a beam identification value associated with at least one of the one or more reference signals.

7. The method of claim 1 further comprising transmitting the measurement values and the identification value associated with the station to a network server, wherein obtaining the location includes receiving the location from the network server.

8. The method of claim 7 wherein the measurement values and the identification value associated with the station are transmitted in single message.

9. The method of claim 1 further comprising:

receiving one or more sidelink reference signals transmitted via the second radio access technology;

determining sidelink measurement values for the one or more sidelink reference signals; and obtaining the location based at least in part on the sidelink measurement values.

10. The method of claim 1 further comprising receiving assistance data from a network server, and obtaining the location is based at least in part on the measurement values, the identification value associated with the station indicated via the discovery signal, and the assistance data.

11. The method of claim 10 wherein the assistance data includes a location of the station and a range class associated with the station.

12. A method for determining a location of a mobile device, comprising:

receiving one or more reference signal measurement values from the mobile device, wherein the one or more reference signal measurement values are based on signals transmitted via a first radio access technology;

receiving one or more neighbor identification values from the mobile device, wherein the one or more neighbor identification values are based on signals received by the mobile device via a second radio access technology that is different from the first radio access technology;

determining the location of a station that corresponds to at least one of the one or more neighbor identification values, wherein determination of the location is based at least in part on the one or more neighbor identification values; and determining the location of the mobile device based at least in part on the one or more reference signal measurement values and the location of the station.

13. The method of claim 12 wherein the first radio access technology is a cellular communication network and the second radio access technology is a device-to-device communication interface.

14. The method of claim 13 wherein the cellular communication network is a long term evolution network or a fifth generation new radio network, and the device-to-device communication interface is a PCS interface.

15. The method of claim 12 wherein the one or more neighbor identification values include at least one of an international mobile equipment identity value, a subscription permanent identifier, a subscription concealed identifier, or a sidelink sequence identification value associated with the station.

16. The method of claim 12 wherein the one or more reference signal measurement values include one of a reference signal received power, a reference signal received quality, a received signal strength indication, a time of arrival, and a round trip signal propagation time.

17. The method of claim 12 wherein the one or more reference signal measurement values include a base station identification value or a beam identification value associated with at least one of the signals transmitted via the first radio access technology.

18. The method of claim 12 wherein the one or more reference signal measurement values and the one or more neighbor identification values are received in single message.

19. The method of claim 12 further comprising:

receiving one or more sidelink measurement values based on signals received by the mobile device via the second radio access technology; and determining the location based at least in part on the one or more sidelink measurement values.

20. The method of claim 12 further comprising providing assistance data to the mobile device, wherein the assistance data includes location information for one or more neighboring stations.

21. A method for determining a location of a mobile device, comprising:

receiving a discovery signal from at least one neighboring user equipment, wherein the discovery signal includes an identification value associated with the at least one neighboring user equipment; and obtaining the location based at least in part on the identification value associated with the at least one neighboring user equipment indicated via the discovery signal.

22. The method of claim 21 further comprising receiving assistance data including identification information and location information associated with one or more neighboring user equipment, wherein obtaining the location is based at least in part on the assistance data.

23. The method of claim 22 wherein the assistance data includes a range class associated with the at least one neighboring user equipment.

24. The method of claim 22 wherein the identification information includes at least one of an international mobile equipment identity value, a subscription permanent identifier, a subscription concealed identifier, or a sidelink sequence identification value associated with the at least one neighboring user equipment.

25. The method of claim 21 wherein the identification value is a sidelink sequence identification value associated with the at least one neighboring user equipment.

26. The method of claim 21 further comprising transmitting the identification value associated with the at least one neighboring user equipment to a network server, wherein obtaining the location includes receiving the location from the network server.

27. The method of claim 21 further comprising obtaining one or more sidelink measurement values based on one or more sidelink messages transmitted from the at least one neighboring user equipment, wherein the one or more sidelink measurement values include one of a reference signal received power, a reference signal received quality, a received signal strength indication, a time of arrival, and a round trip signal propagation time.

28. The method of claim 21 further comprising transmitting the identification value associated with the at least one neighboring user equipment to a network station via a sidelink, wherein obtaining the location includes receiving the location from the network station via the sidelink.

29. The method of claim 21 wherein the at least one neighboring user equipment is a roadside unit, and the discovery signal is received via a sidelink.

30. The method of claim 29 wherein the sidelink is a PCS interface.

31. The method of claim 21 wherein the at least one neighboring user equipment is configured as a base station, and the discovery signal is received via a Uu interface.

32. An apparatus, comprising:

a memory;

at least one transceiver; and at least one processor communicatively coupled to the memory and the at least one transceiver, and configured to:

receive one or more reference signals transmitted via a first radio access technology;

determine measurement values for the one or more reference signals;

receive a discovery signal from a station via a second radio access technology that is different from the first radio access technology, wherein the discovery signal includes an identification value associated with the station; and obtain a location based at least in part on the measurement values and the identification value associated with the station indicated via the discovery signal.

33. The apparatus of claim 32 wherein the at least one processor is further configured to transmit the measurement values and the identification value associated with the station to a network server, wherein obtaining the location includes receiving the location from the network server.

34. The apparatus of claim 32 wherein the at least one processor is further configured to:

receive one or more sidelink reference signals transmitted via the second radio access technology;

determine sidelink measurement values for the one or more sidelink reference signals; and obtain the location based at least in part on the sidelink measurement values.

35. An apparatus, comprising:

a memory;

at least one transceiver; and at least one processor communicatively coupled to the memory and the at least one transceiver, and configured to:

receive one or more reference signal measurement values from a mobile device, wherein the one or more reference signal measurement values are based on signals transmitted via a first radio access technology;

receive one or more neighbor identification values from the mobile device, wherein the one or more neighbor identification values are based on signals received by the mobile device via a second radio access technology that is different from the first radio access technology;

determine a location of a station that corresponds to at least one of the one or more neighbor identification values, wherein determination of the location is based at least in part on the one or more neighbor identification values; and determine a location of the mobile device based at least in part on the one or more reference signal measurement values and the location of the station.

36. The apparatus of claim 35 wherein the at least one processor is further configured to:

receive one or more sidelink measurement values based on signals received by the mobile device via the second radio access technology; and determine the location based at least in part on the one or more sidelink measurement values.

37. An apparatus, comprising:

a memory;

at least one transceiver; and at least one processor communicatively coupled to the memory and the at least one transceiver, and configured to:

receive a discovery signal from at least one neighboring user equipment, wherein the discovery signal includes an identification value associated with the at least one neighboring user equipment; and obtain a location based at least in part on the identification value associated with the at least one neighboring user equipment indicated via the discovery signal.

38. The apparatus of claim 37 wherein the at least one processor is further configured to receive assistance data including identification information and location information associated with one or more neighboring user equipment, wherein obtaining the location is based at least in part on the assistance data.

39. The apparatus of claim 37 wherein the at least one processor is further configured to obtain one or more sidelink measurement values based on one or more sidelink messages transmitted from the at least one neighboring user equipment, wherein the one or more sidelink measurement values include one of a reference signal received power, a reference signal received quality, a received signal strength indication, a time of arrival, and a round trip signal propagation time.

40. The apparatus of claim 37 wherein the at least one processor is further configured to transmit the identification value associated with the at least one neighboring user equipment to a network station via a sidelink, wherein obtaining the location includes receiving the location from the network station via the sidelink.

* * * * *